(12) United States Patent
Takano et al.

(10) Patent No.: US 9,017,120 B2
(45) Date of Patent: Apr. 28, 2015

(54) OUTBOARD MOTOR AND WATERCRAFT INCLUDING THE SAME

(71) Applicant: Yamaha Hatsudoki Kabushiki Kaisha, Iwata-shi, Shizuoka (JP)

(72) Inventors: Tomotaka Takano, Shizuoka (JP); Satoshi Miyazaki, Shizuoka (JP); Yusuke Takahashi, Shizuoka (JP); Shuji Kato, Shizuoka (JP); Atsushi Suzuki, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 239 days.

(21) Appl. No.: 13/713,222

(22) Filed: Dec. 13, 2012

(65) Prior Publication Data
US 2013/0157532 A1 Jun. 20, 2013

(30) Foreign Application Priority Data
Dec. 14, 2011 (JP) ................................. 2011-273780

(51) Int. Cl.
| | | |
|---|---|---|
| F01N 3/04 | (2006.01) | |
| B63H 20/00 | (2006.01) | |
| F02F 1/10 | (2006.01) | |
| F02F 1/24 | (2006.01) | |
| F02F 1/40 | (2006.01) | |
| F02B 61/04 | (2006.01) | |
| F02B 75/22 | (2006.01) | |
| F01N 13/00 | (2010.01) | |
| F01N 13/10 | (2010.01) | |
| F01P 3/20 | (2006.01) | |
| F01N 13/12 | (2010.01) | |

(52) U.S. Cl.
CPC ............... *B63H 20/001* (2013.01); *F01P 3/202* (2013.01); *F02F 1/108* (2013.01); *F02F 1/243* (2013.01); *F02F 1/40* (2013.01); *F02B 61/045* (2013.01); *F02B 75/22* (2013.01); *F01N 3/046* (2013.01); *F01N 13/004* (2013.10); *F01N 13/107* (2013.01); *F01N 13/12* (2013.01); *F01N 2590/021* (2013.01); *Y02T 10/20* (2013.01)

(58) Field of Classification Search
CPC ...... F02B 61/045; F02B 55/10; F01N 13/004; F01N 13/005; F01N 2590/21; F01P 3/202; F01P 2003/024
USPC ........ 440/88 C, 88 G, 88 J, 88 K, 89 B, 89 C, 440/89 D; 123/41.82 R, 41.82 A, 41.72, 84; 60/321, 640
See application file for complete search history.

(56) References Cited

U.S. PATENT DOCUMENTS

| | | | | |
|---|---|---|---|---|
| 5,975,033 | A * | 11/1999 | Wada ..................... | 123/41.82 R |
| 6,418,887 | B1 * | 7/2002 | Okamoto ................. | 123/41.33 |
| 6,821,171 | B1 * | 11/2004 | Wynveen et al. ........... | 440/88 C |
| 6,976,892 | B2 * | 12/2005 | Tawa et al. ................. | 440/88 G |

FOREIGN PATENT DOCUMENTS

JP 2791876 B2 8/1998

OTHER PUBLICATIONS

Suzuki et al, "Outboard Motor and Watercraft Including the Same", U.S. Appl. No. 13/713,213, filed Dec. 13, 2012.
Kato et al, "Outboard Motor and Watercraft Including the Same", U.S. Appl. No. 13/713,202, filed Dec. 13, 2012.

* cited by examiner

*Primary Examiner* — S. Joseph Morano
*Assistant Examiner* — Andrew Polay
(74) *Attorney, Agent, or Firm* — Keating & Bennett, LLP

(57) ABSTRACT

An outboard motor includes an engine, a water intake opening arranged to suck in water, and a water supply path arranged to supply the water sucked in through the water intake opening to the engine. The engine includes a water path arranged to cause the water supplied from the water supply path to flow in a water jacket of a cylinder head, a water jacket of an exhaust pipe, and a water jacket of a cylinder block in this order.

14 Claims, 33 Drawing Sheets

OUTBOARD MOTOR AND WATERCRAFT INCLUDING THE SAME

CROSS-REFERENCES TO RELATED APPLICATIONS

The present application claims priority from Japanese Patent Application No. 2011-273780, filed on Dec. 14, 2011, which is incorporated by reference herein in its entirety.

BACKGROUND OF THE INVENTION

1. Field of the Invention

The present invention relates to an outboard motor and a watercraft including the same.

2. Description of the Related Art

Conventionally, water of the sea, river or the like (hereinafter, referred to as "external water") on which a watercraft is traveling is used to cool an engine of an outboard motor of the watercraft.

An engine includes a cylinder block having a cylinder in which a piston is slidably accommodated and also includes a cylinder head attached to a tip portion of the cylinder block so as to cover the cylinder. The cylinder, the piston and the cylinder head form a combustion chamber. The cylinder head has an intake port and an exhaust port facing the combustion chamber. The exhaust port is connected to an exhaust pipe for discharging exhaust gas. In the cylinder block, the cylinder head and the exhaust pipe, a water jacket for causing external water acting as cooling water to flow is formed.

External water does not exist for the purpose of cooling engines. The temperature of the external water is lower than the temperature of cooling water for cooling an engine of an automobile or the like. Usually, the temperature difference between the engine and the external water is significantly large. Therefore, if the external water is caused to flow in the water jacket of the cylinder block, the water jacket of the cylinder head and the water jacket of the exhaust pipe in this order, the cylinder block may be cooled excessively at the time of start of the engine, which may deteriorate the warm-up characteristics. When the temperature of the cylinder block is too low, the viscosity of a lubricant provided between an inner wall of the cylinder and the piston is likely to be raised, which increases the resistance against the reciprocating motion of the piston. This may undesirably increase the engine loss and thus decrease the fuel efficiency. By contrast, excessive cooling of the exhaust pipe does not specifically cause any adverse influence. Thus, it has been proposed to cause the external water to flow in the water jacket of the exhaust pipe, the water jacket of the cylinder head and the water jacket of the cylinder block in this order (see Japanese Patent No. 2791876).

However, in the outboard motor, after the warm-up is finished, the temperature of the exhaust pipe is likely to be raised in addition to the temperature of the cylinder head and the temperature of the cylinder block. With the above-described conventional technology, the temperature of the external water becomes significantly high when flowing in the water jacket of the exhaust pipe. As a result, the temperature of the external water supplied to the water jacket of the cylinder head is significantly high. This causes a problem of deteriorating the cooling performance of the cylinder head and the cylinder block.

Aside from the above technology, it is conceived to cause all of the external water to flow in the water jacket of the cylinder head, the water jacket of the cylinder block and the water jacket of the exhaust pipe in this order. In this case, the water jacket of the exhaust pipe is supplied with the high-temperature external water which has cooled the cylinder head and the cylinder block. However, as described above, in the outboard motor, the temperature of the exhaust pipe is likely to be raised. This may raise the temperature of the water supplied to the water jacket of the exhaust pipe and thus the exhaust pipe may not be cooled sufficiently. As a result, the temperature of the outboard motor may be undesirably high.

SUMMARY OF THE INVENTION

Preferred embodiments of the present invention provide an outboard motor and a watercraft which can cool the engine efficiently and with good balance.

An outboard motor according to a preferred embodiment of the present invention includes an engine; a water intake opening arranged to suck in water; and a water supply path arranged to supply the water sucked in through the water intake opening to the engine. The engine includes a cylinder block including a plurality of cylinders each including a piston slidably accommodated therein, the cylinder block including a water jacket arranged to cause water to flow therein; a cylinder head attached to the cylinder block so as to cover the cylinders and defining a combustion chamber together with each of the cylinders and the corresponding piston, the cylinder head including an exhaust port provided therein, facing the combustion chamber, to discharge exhaust gas in the combustion chamber and also including a water jacket arranged to cause water to flow therein; an exhaust pipe provided to the cylinder head so as to communicate with the exhaust port and including a water jacket arranged to cause water to flow therein; and a water path arranged to cause the water supplied from the water supply path to flow in the water jacket of the cylinder head, the water jacket of the exhaust pipe, and the water jacket of the cylinder block in this order.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 9 is a vertical cross-sectional view of a surge tank and the like.

FIG. 11 is a left side view of an exhaust manifold, an exhaust pipe and the like.

FIG. 17 is a partial rear view showing the high-pressure fuel pump, a fuel supply rail, a fuel injection device and the like.

FIG. 18 is a perspective view of a fuel pipe, the fuel supply rail and the like.

DETAILED DESCRIPTION OF THE PREFERRED EMBODIMENTS

Figure 1:
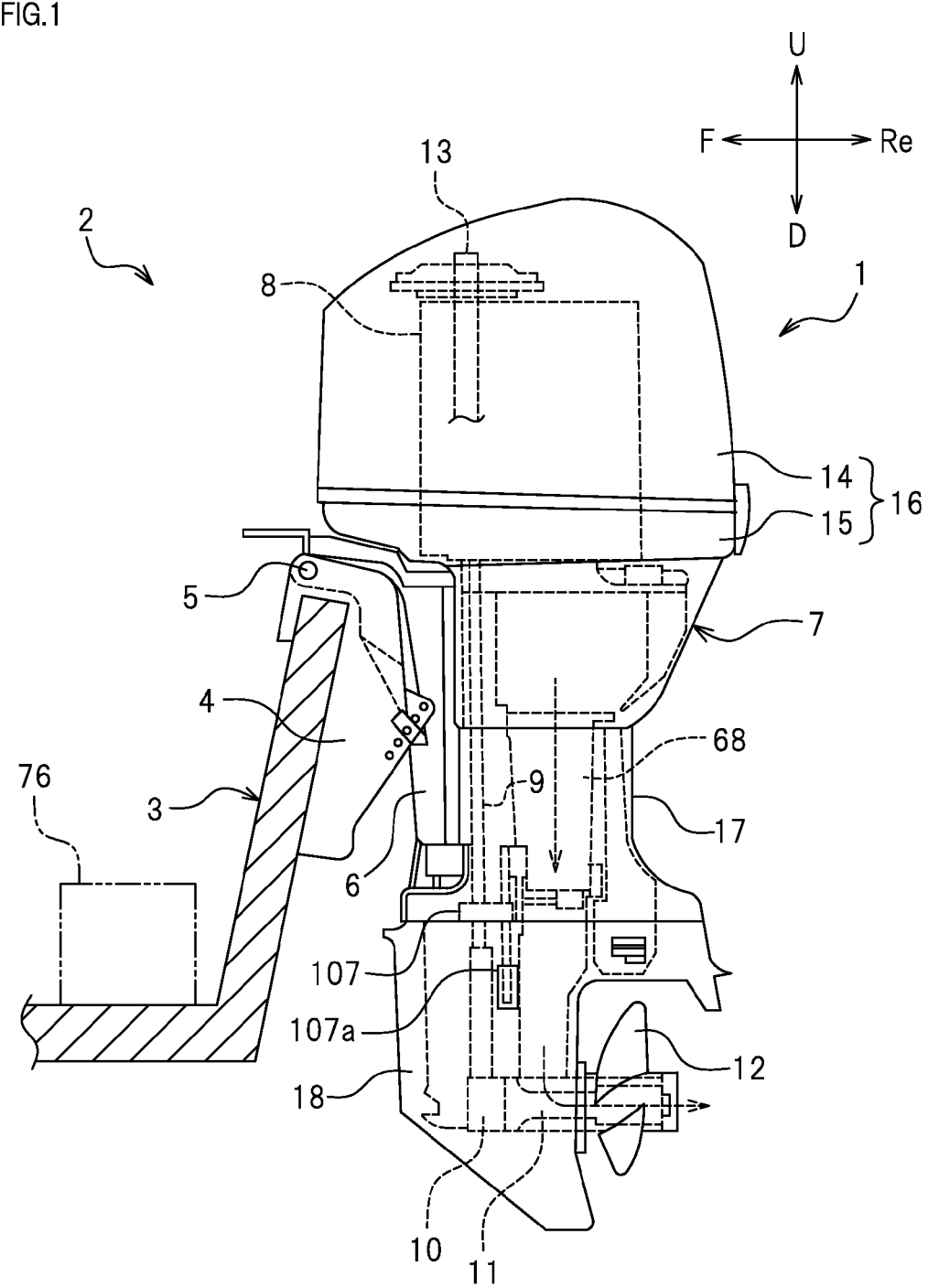
FIG. 1 is a side view of a portion of a hull and an outboard motor.

As shown in FIG. 1, a watercraft 2 includes a hull 3 and an outboard motor 1 attached to a rear portion of the hull 3. In the following description, the terms "front", "rear", "left" and "right" respectively refer to front, rear, left and right with respect to the travelling direction of the watercraft 2 unless otherwise specified. In the figures, reference signs, F, Re, L and R (see FIG. 2 and the like) respectively represent front, rear, left and right. Reference signs U and D respectively represent up and down. The outboard motor 1 includes a clamp bracket 4 secured to the rear portion of the hull 3, a swivel bracket 6 swingably coupled to the clamp bracket 4 via a tilt shaft 5, and an outboard motor main body 7 secured to the swivel bracket 6.

Inside the swivel bracket 6, a swivel shaft (not shown) extending in a vertical direction is provided. The outboard motor main body 7 is rotatable about the swivel shaft. By rotating the outboard motor main body 7 about the swivel shaft, the orientation of the outboard motor main body 7 can be changed to obliquely leftward or to obliquely rightward. The outboard motor main body 7 is swingable leftward and rightward about the swivel shaft. A swing of the swivel bracket 6 about the tilt shaft 5 allows the outboard motor main body 7 to swing about the tilt shaft 5 together with the swivel bracket 6. As can be seen, the outboard motor main body 7 is swingable about a vertical axis and also swingable about a horizontal axis.

The outboard motor main body 7 includes an engine 8, a drive shaft 9 extending downward from the engine 8, a switch mechanism 10 arranged to switch the movement of the outboard motor 1 between a forward movement and a rearward movement, a propeller shaft 11, and a propeller 12 secured to a tip of the propeller shaft 11. The engine 8 includes a crankshaft 13 extending in the vertical direction. Herein, the term "vertical" encompasses the vertical direction in a narrow sense and also a direction slightly inclined from the vertical direction. More specifically, the term "vertical" encompasses a substantially vertical direction. A bottom end portion of the crankshaft 13 is coupled to a top end portion of the drive shaft 9. A bottom end portion of the drive shaft 9 is coupled to a front end portion of the propeller shaft 11 via the switch mechanism 10.

The outboard motor 1 includes, as a housing to cover the engine 8 and the like, a cowling 16 including a top cowl 14 and a bottom cowl 15, an upper case 17 connected to a bottom portion of the cowling 16, and a lower case 18 connected to a bottom portion of the upper case 17. The engine 8 is accommodated in the cowling 16. The cowling may be referred to as an "engine cover".

When the engine 8 is driven, the crankshaft 13 is rotated. Along with the rotation of the crankshaft 13, the drive shaft 9 is rotated. A driving force of the drive shaft 9 is transmitted to the propeller shaft 11 via the switch mechanism 10. Along with the rotation of the drive shaft 9, the propeller shaft 11 is rotated. When the propeller shaft 11 is rotated, the propeller 12 is rotated and thus a thrust is generated. The propeller shaft 11 and the propeller 12 are rotatable in both of two directions. The rotation direction of the propeller shaft 11 and the propeller 12 is switched by the switch mechanism 10. When rotating in one direction, the propeller 12 generates a forward (i.e., leftward in FIG. 1) thrust. When rotating in the other direction, the propeller 12 generates a rearward (i.e., rightward in FIG. 1) thrust.

Figure 2:
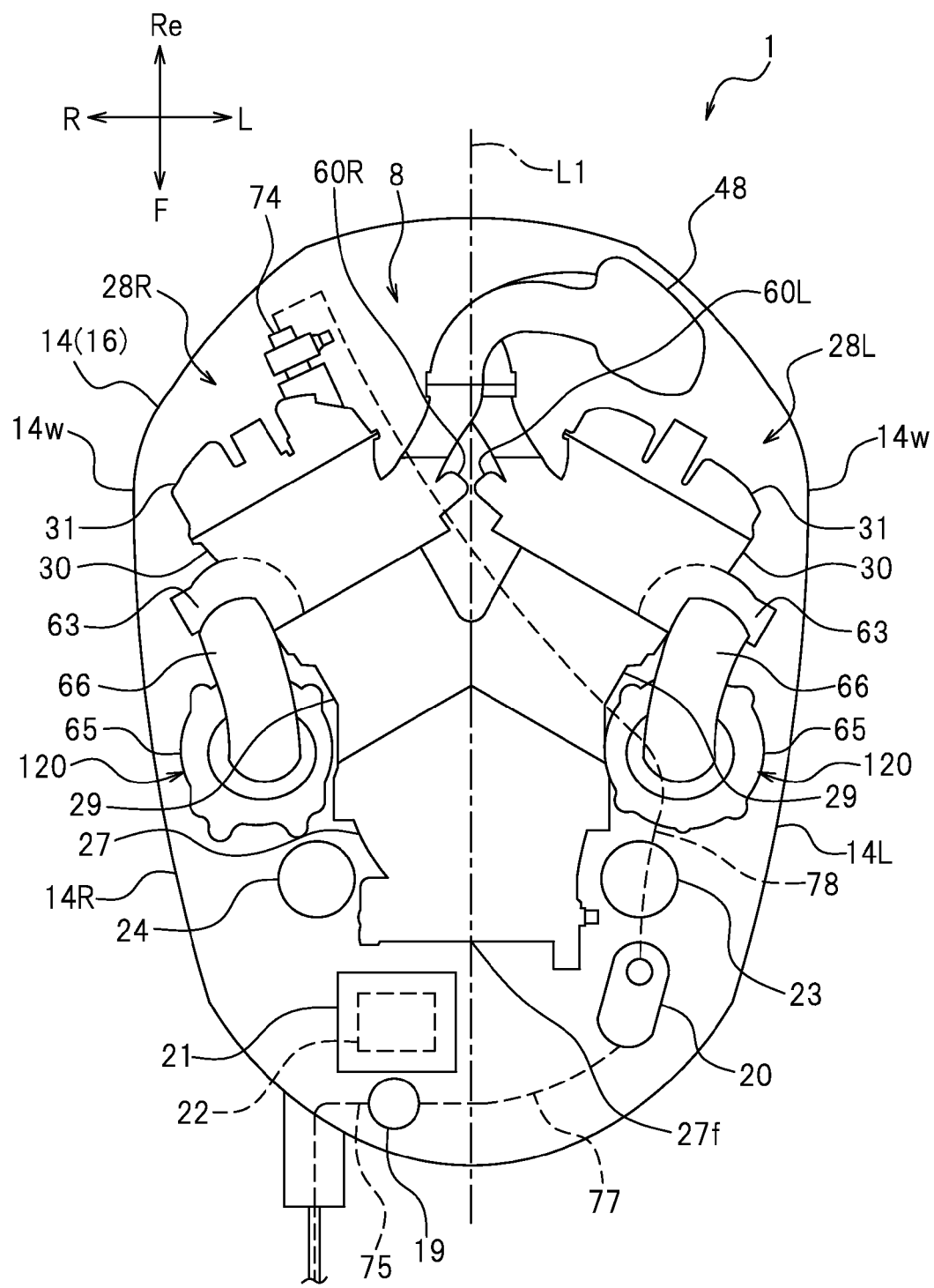
FIG. 2 is a plan view conceptually showing an internal structure of the outboard motor.
Figure 3:
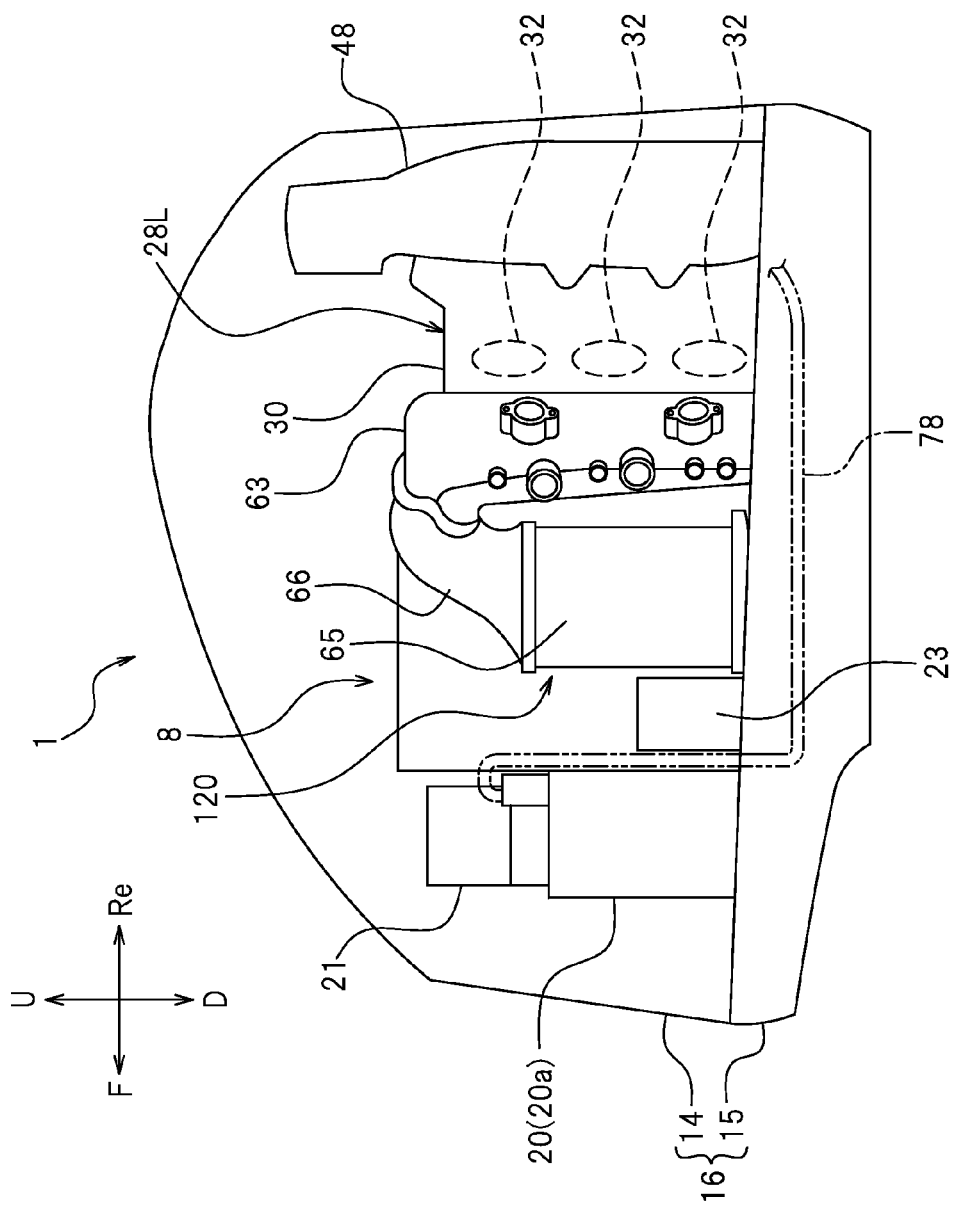
FIG. 3 is a left side view of a portion of the outboard motor.
Figure 4:
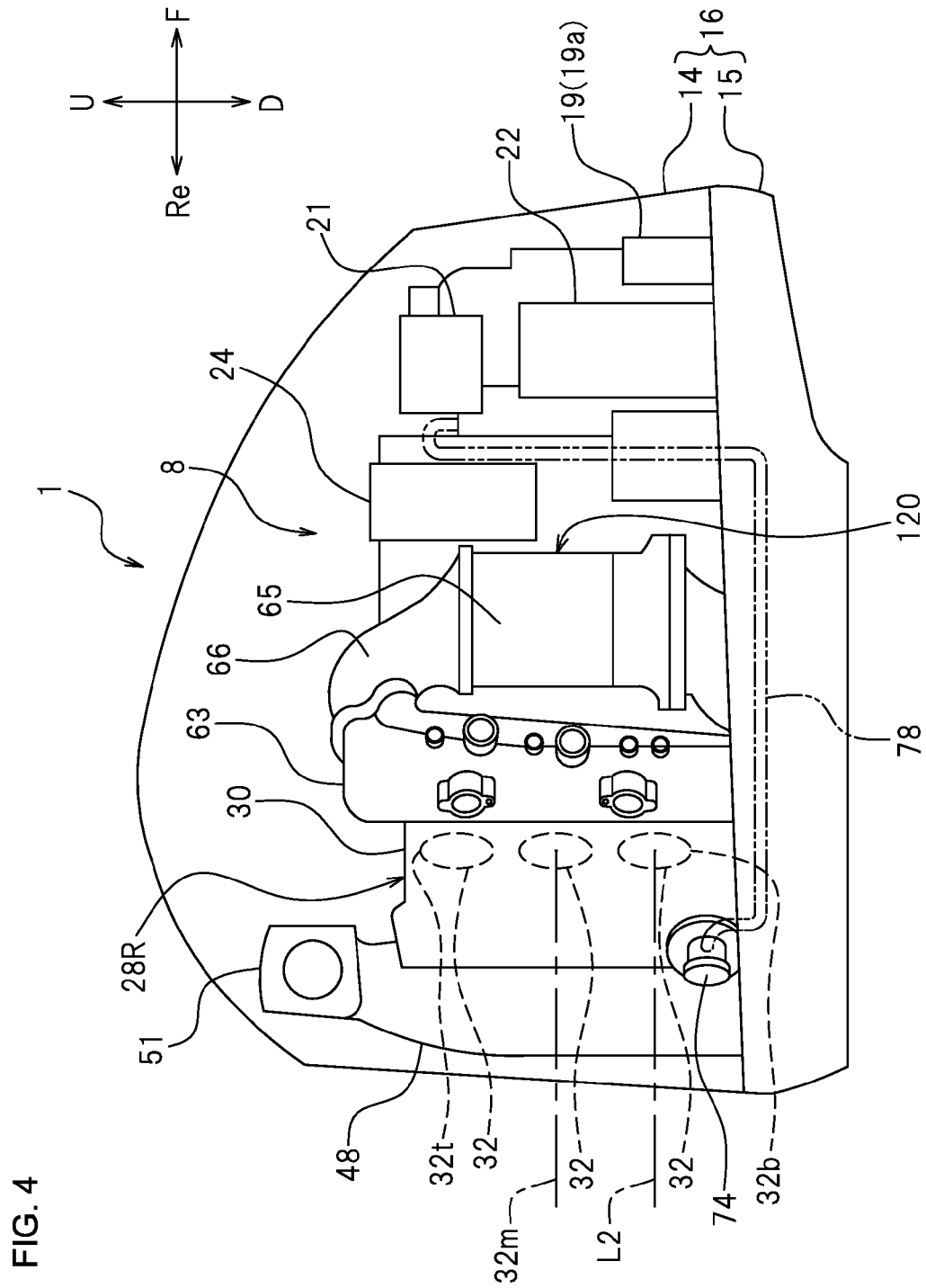
FIG. 4 is a right side view of a portion of the outboard motor.
Figure 5:
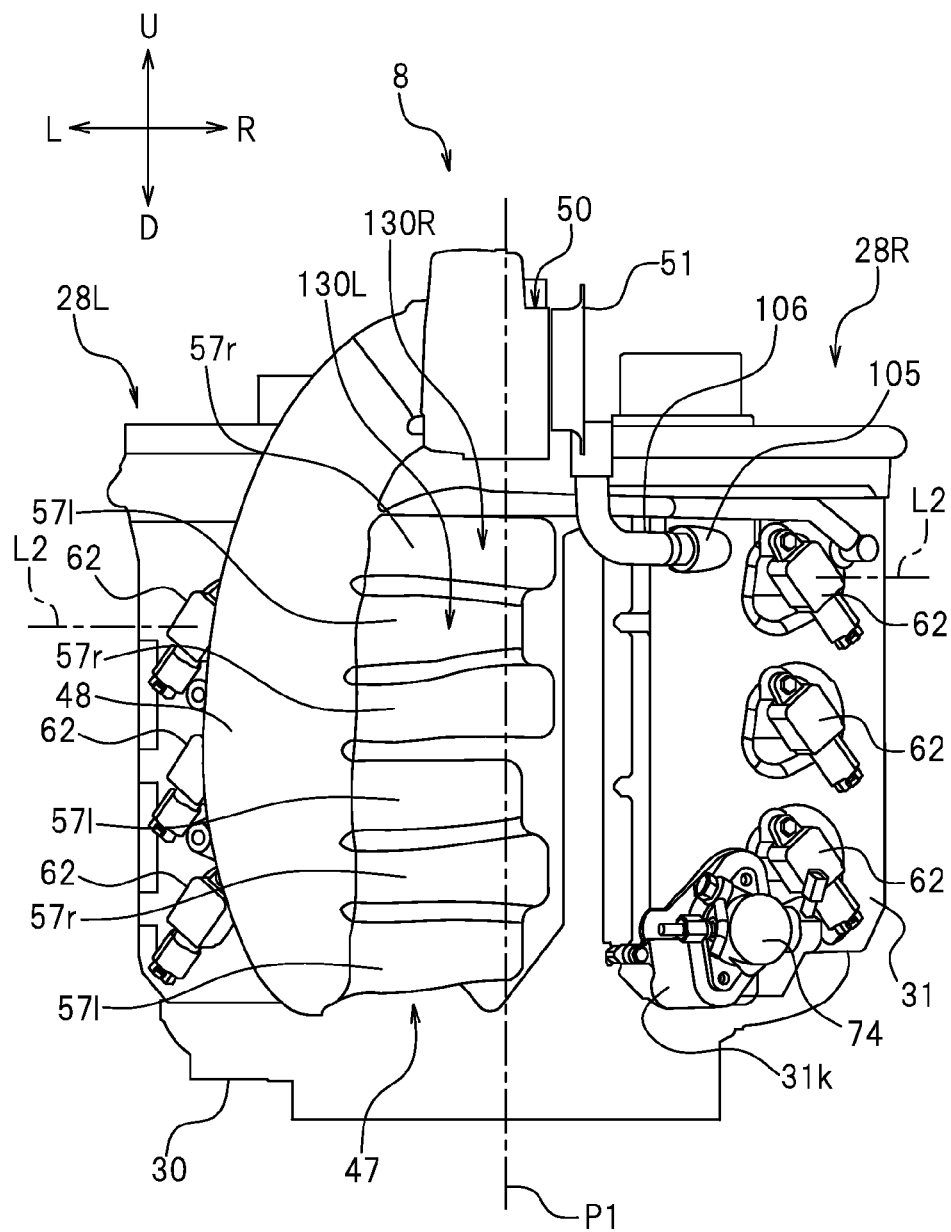
FIG. 5 is a rear view of an engine.

FIG. 2 is a schematic plan view showing an internal structure of the cowling 16. FIG. 3 is a schematic left side view showing an internal structure of the cowling 16, and FIG. 4 is a schematic right side view thereof. FIG. 5 is a rear view of the engine 8.

In FIG. 2, line L1 represents a center line of the engine 8. The center line L1 passes a center 13a (see FIG. 6) of the crankshaft 13, and is defined as a straight line extending in the front-rear direction. The center line L1 is also referred to as the center line of the outboard motor 1. In the following description, the expression "inward in the outboard motor width direction" refers to a position closer to the center line L1 of the outboard motor 1, and the expression "outward in the outboard motor width direction" refers to a position farther from the center line L1 of the outboard motor 1. In this preferred embodiment, the "outboard motor width direction" refers to the left-right direction.

As shown in FIG. 2, the top cowl 14 of the cowling 16 is preferably arranged to be bilaterally symmetric with respect to the center line L1. The top cowl 14 preferably has a width that first increases from a front end and then decreases toward a rear end. The top cowl 14 preferably has a substantially egg-shaped profile. A portion where the width is maximum (hereinafter, referred to as a "maximum portion") 14w is located rearward of the center position in the front-rear direction. The maximum portion 14w is located at a position which is forward with respect to the rear end thereof by about ¼ of the entire length of the top cowl 14. The rear end and the entire length of the top cowl 14 are respectively the rear end and the entire length of the cowling 16.

As described later in detail, the outboard motor 1 includes an intake system arranged to supply air to the engine 8, an exhaust system arranged to discharge the exhaust gas from the engine 8, a fuel supply system arranged to supply fuel to the engine 8, and a cooling system arranged to supply cooling water to the engine 8. As shown in FIG. 5, the intake system includes a throttle body 50 including a throttle valve accommodated therein, a surge tank 48 to which air is supplied from the throttle body 50, and an intake manifold 47 arranged to distribute the air to each of combustion chambers of the engine 8 from the surge tank 48. As shown in FIG. 3, the exhaust system includes an exhaust manifold 63 arranged to join the exhaust gas from the combustion chambers, and an exhaust pipe 120 including a catalyst accommodated therein. As shown in FIG. 2, the fuel supply system includes a fuel filter 19, a vapor separator tank 20, and a high-pressure fuel pump 74. The cooling system includes a water pump 107 (see FIG. 1) and water jackets included in the engine 8 and the like.

As shown in FIG. 2, the cowling 16 also accommodates other components such as a fuse box 21, an ECU (Engine Control Unit) 22 (see FIG. 4), an oil filter 23, a starter motor 24 and the like accommodated therein.

The engine 8 preferably is a water-cooled V-shaped multi-cylinder engine, for example. In this preferred embodiment, the engine 8 preferably is a V-shaped 6-cylinder engine, for example. The type of engine according to the present invention is not limited however, and the number of cylinders of the engine according to the present invention is not limited to 6.

Figure 6:
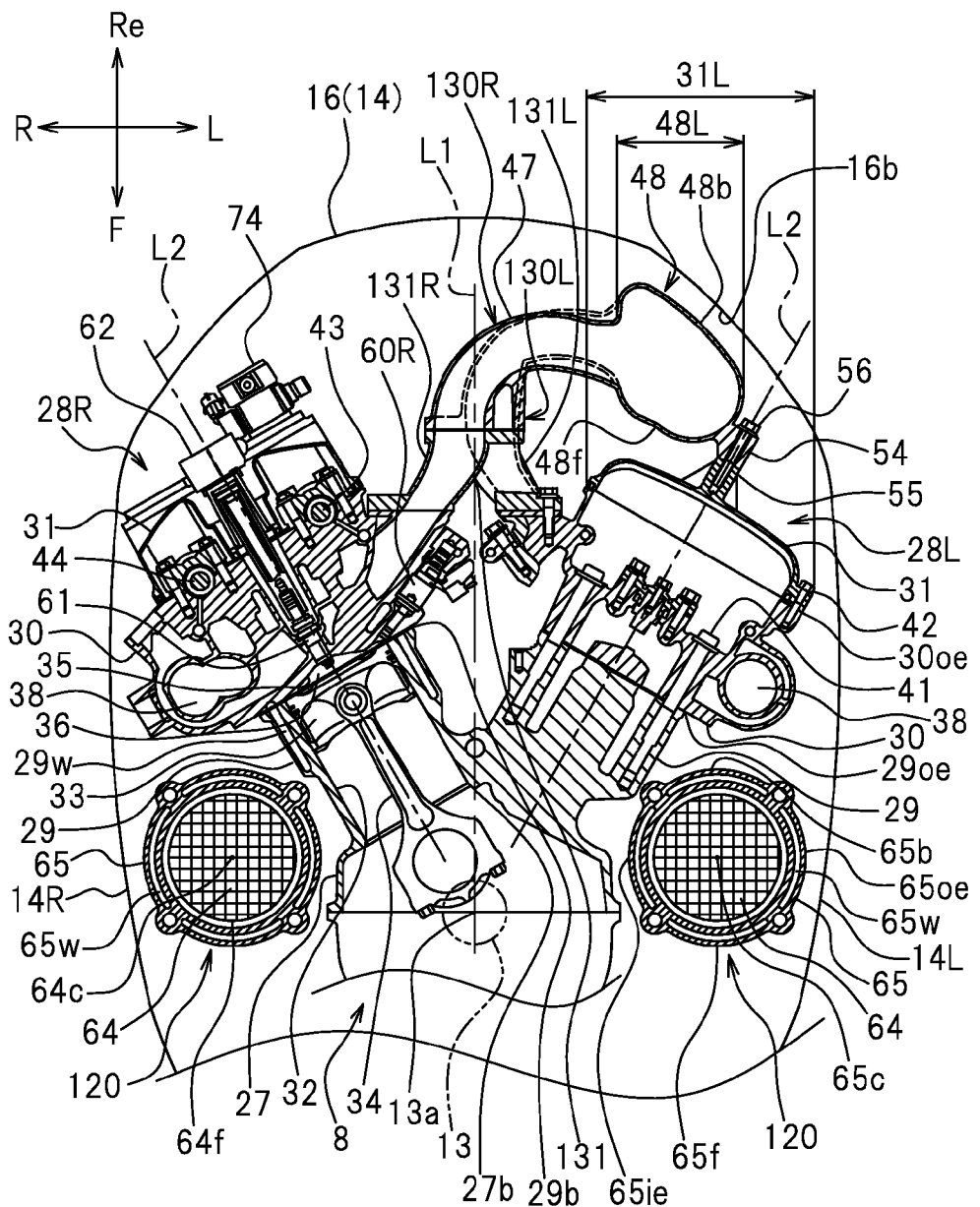
FIG. 6 is a horizontal cross-sectional view of a portion of the engine.

As shown in FIG. 6, the engine 8 includes a crankcase 27, a left bank 28L extending in an obliquely rearward and leftward direction, and a right bank 28R extending in an obliquely rearward and rightward direction. The left bank 28L and the right bank 28R each include a cylinder block 29 including cylinders 32 provided therein, a cylinder head 30 linked to the cylinder block 29 so as to cover the cylinders 32, and a head cover 31 arranged cover a tip portion of the cylinder head 30.

Figure 7:
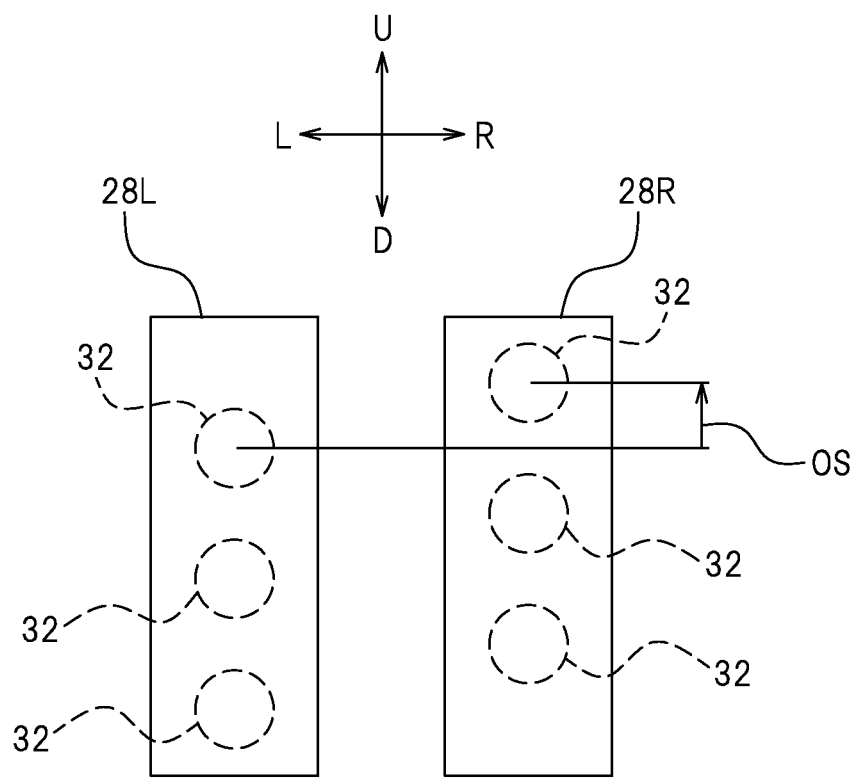
FIG. 7 is a conceptual view provided for explaining how cylinders are offset.

As schematically shown in FIG. 7, the left bank 28L and the right bank 28R each include three cylinders 32, for example, arranged in the vertical direction. The cylinders 32 in the left bank 28L and the cylinders 32 in the right bank 28R are located alternately in the up-down direction. The three cylinders 32 in each of the left bank 28L and the right bank 28R are referred to as the lowermost cylinder 32, the middle cylinder 32 and the uppermost cylinder 32 sequentially from the bottom. The lowermost cylinder 32 in the left bank 28L is located at a position lower than that of the lowermost cylinder 32 in the right bank 28R. The uppermost cylinder 32 in the right bank 28R is located at a position higher than that of the uppermost cylinder 32 in the left bank 28L. The middle cylinder 32 in the left bank 28L is located at a position higher than that of the lowermost cylinder 32 in the right bank 28R and lower than that of the middle cylinder in the right bank 28R. The uppermost cylinder 32 in the left bank 28L is located at a position higher than that of the middle cylinder 32 in the right bank 28R and lower than that of the uppermost cylinder in the right bank 28R. The cylinders 32 in the right bank 28R are offset upward with respect to the cylinders 32 in the left bank 28L by a distance OS. The cylinders may be offset in the opposite manner. More specifically, the cylinders 32 in the left bank 28L may be offset upward with respect to the cylinders 32 in the right bank 28R by the distance OS.

As shown in FIG. 6, the left bank 28L and the right bank 28R preferably are located bilaterally asymmetrically with respect to the center line L1. The positions in the left bank 28L and the right bank 28R in the front-rear direction preferably are substantially the same.

The crankcase 27 includes the crankshaft 13 accommodated therein. The center 13a of the crankshaft 13 is located on the center line L1.

In this preferred embodiment, the cylinder block 29 preferably is a unitary integral member. Alternatively, the cylinder block 29 may be a combination of a plurality of members. For example, a portion of the cylinder block 29 covering the crankshaft 13 and a portion of the cylinder block 29 including the cylinders 32 accommodated therein (in other words, a portion defining a so-called cylinder bore) may be separate from each other and secured to each other preferably by a bolt or other securing member, for example. The cylinder block 29 is secured to the crankcase 27 preferably by, for example, a bolt or other securing member, for example. In the present preferred embodiment, the cylinders 32 are formed preferably by forming a thin layer on an inner surface of the bore of the cylinder block 29 by thermal spraying, plating or other suitable process. Thus, the cylinders 32 preferably are integral with the cylinder block 29. Alternatively, the cylinders 32 may be formed separately from the cylinder block 29 and, for example, press-fit into the cylinder block 29. In each cylinder 32, the piston 33 is slidably located. The piston 33 is coupled to the crankshaft 13 via a connecting rod 34.

Figure 8:
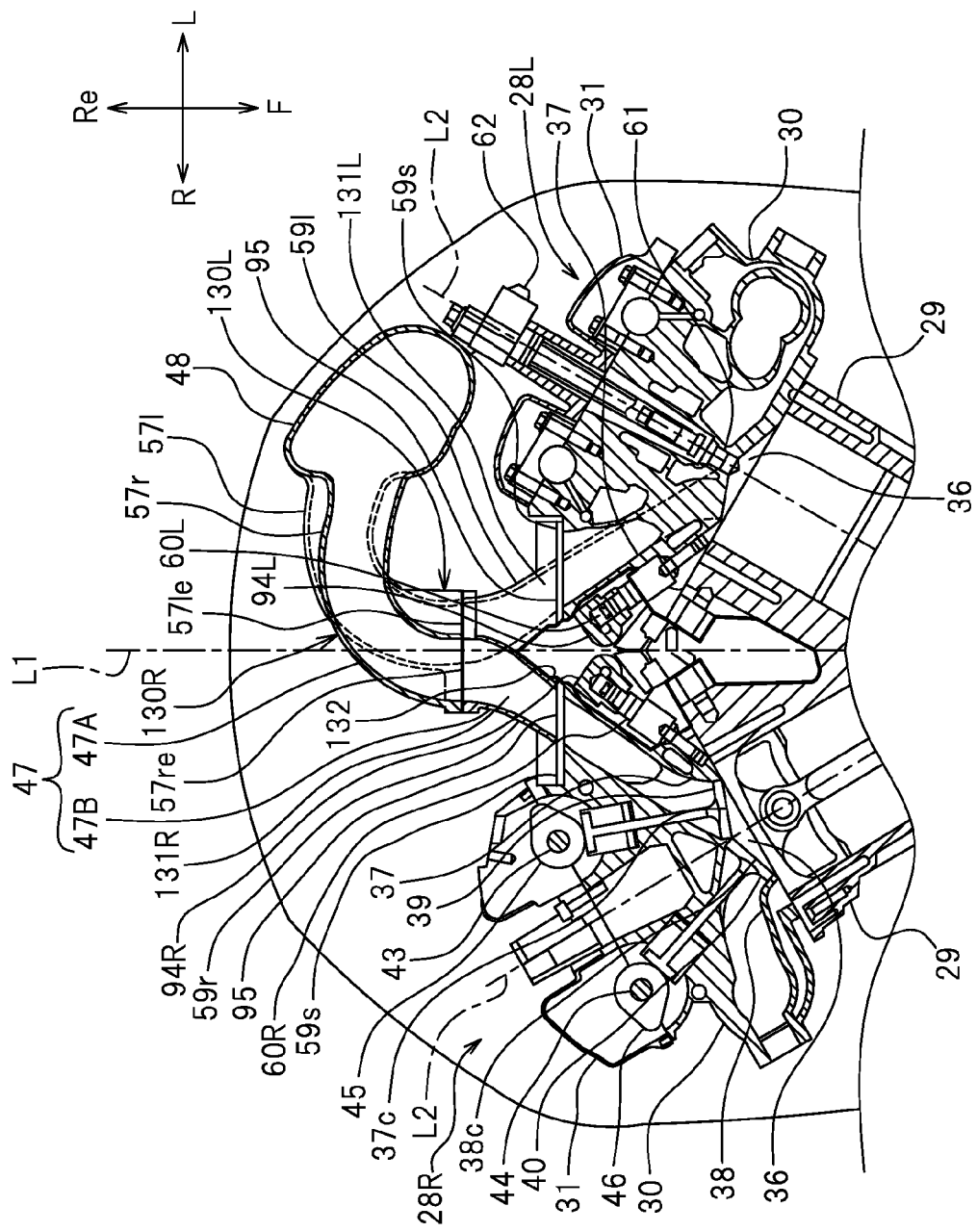
FIG. 8 is a horizontal cross-sectional view of a portion of the engine.

The cylinder head 30 is linked to a rear end portion of the cylinder block 29 preferably by bolts 41, for example. The cylinder head 30 includes a recess 35 provided therein. The recess 35, an inner wall of the cylinder 32 and an apex surface of the piston 33 define a combustion chamber 36. As shown in FIG. 8, the cylinder head 30 includes intake ports 37 and exhaust ports 38 facing each combustion chamber 36 provided therein (in FIG. 8, only one intake port 37 and only one exhaust ports 38 are shown). The cylinder head 30 accommodates an intake valve 39 arranged to open/close the intake port 37 and an exhaust valve 40 arranged to open/close the exhaust port 38. The intake port 37 is located inward relative to a cylinder axis line L2 in the outboard motor width direction. A center of an open end and a center of an intake valve 39 of the intake port 37 (these centers match each other and thus will be referred to simply as the "center 37c of the intake port 37", hereinafter) are located inward relative to the cylinder axis line L2 in the outboard motor width direction. The exhaust port 38 is located outward relative to the cylinder axis line L2 in the outboard motor width direction. A center of an open end and a center of an exhaust valve 40 of the exhaust valve 38 (these centers match each other and thus will be referred to simply as the "center 38c of the exhaust port 38", hereinafter) are located outward relative to the cylinder axis line L2 in the outboard motor width direction.

As shown in FIG. 6, the head cover 31 is linked to a rear end portion of the cylinder head 30 preferably by a bolt 42, for example.

The engine 8 directly injects fuel into the combustion chambers 36. As shown in FIG. 8, the cylinder heads 30 are respectively provided with fuel injection devices 60L and fuel injection devices 60R to inject fuel (in FIG. 8, only one fuel injection device 60L and only one fuel injection device 60R are shown). As seen in a plan view, the fuel injection devices 60L and 60R are located between an assembly of the cylinder head 30 and the cylinder block 29 in the left bank 28L and an assembly of the cylinder head 30 and the cylinder block 29 in the right bank 28R. More specifically, as seen in a plan view, the fuel injection devices 60L and 60R are located in an area 132 enclosed by the cylinder head 30 in the left bank 28L, the cylinder block 29 in the left bank 28L, the cylinder block 29 in the right bank 28R and the cylinder head 30 in the right bank 28R.

The fuel injection device 60L in the left bank 28L is located in an obliquely rearward and rightward orientation. The fuel injection device 60L is located to the right of the intake port 37 in the left bank 28L so as to be parallel or substantially parallel to the intake port 37. At least a portion of the left fuel injection device 60L is located to the left of the center line L1. In this example, the entirety of the left fuel injection device 60L is located to the left of the center line L1.

The fuel injection device 60R in the right bank 28R is arranged in an obliquely rearward and leftward orientation. The fuel injection device 60R is located to the left of the intake port 37 in the right bank 28R so as to be parallel or substantially parallel to the intake port 37. At least a portion of the right fuel injection device 60R is located to the right of the center line L1. In this example, the entirety of the right fuel injection device 60R is located to the right of the center line L1.

The cylinder head 30 accommodates ignition plugs 61 (only one is shown in FIG. 8) as ignition devices. Each ignition plug 61 is inserted into the corresponding cylinder head 30 along the cylinder axis line L2 and is located in a center portion of the cylinder head 30. A tip portion of the ignition plug 61, which is an ignition portion, is located in the combustion chamber 36. As shown in FIG. 6, a connector 62 for the ignition plug 61 is attached to the head cover 31. Although not shown, the connector 62 is connected to an electric wire.

As shown in FIG. 8, inside each head cover 31 and each cylinder head 30, an intake cam shaft 43 and an exhaust cam shaft 44 are provided. The intake cam shaft 43 is located inward relative to the cylinder axis line L2 in the outboard motor width direction, and the exhaust cam shaft 44 is located outward relative to the cylinder axis line L2 in the outboard motor width direction. The intake cam shaft 43 is provided with intake cams 45 (only one is shown in FIG. 8) arranged to drive the intake valve 39. The exhaust cam shaft 44 is provided with an exhaust cam 46 arranged to drive the exhaust valve 40. Although not shown, the intake cam shaft 43 and the exhaust cam shaft 44 are coupled to the crankshaft 13 preferably via a chain or a belt, for example. The intake cam shaft 43 and the exhaust cam shaft 44 are driven by the crankshaft 13 and rotated together with the crankshaft 13.

As shown in FIG. 5, the outboard motor 1 includes, as the intake system to supply air to the engine 8, the throttle body 50 including a throttle valve 49 (see FIG. 9) accommodated therein, the surge tank 48 connected to the throttle body 50, and the intake manifold 47 arranged to connect the surge tank 48 and all the intake ports 37 to each other. As shown in FIG. 8, the intake manifold 47 defines left and right intake paths 130L and 130R. In FIG. 6, reference sign 131 represents a front end of an overlapping portion of the intake paths 130L and 130R as seen in a plan view.

Figure 9:
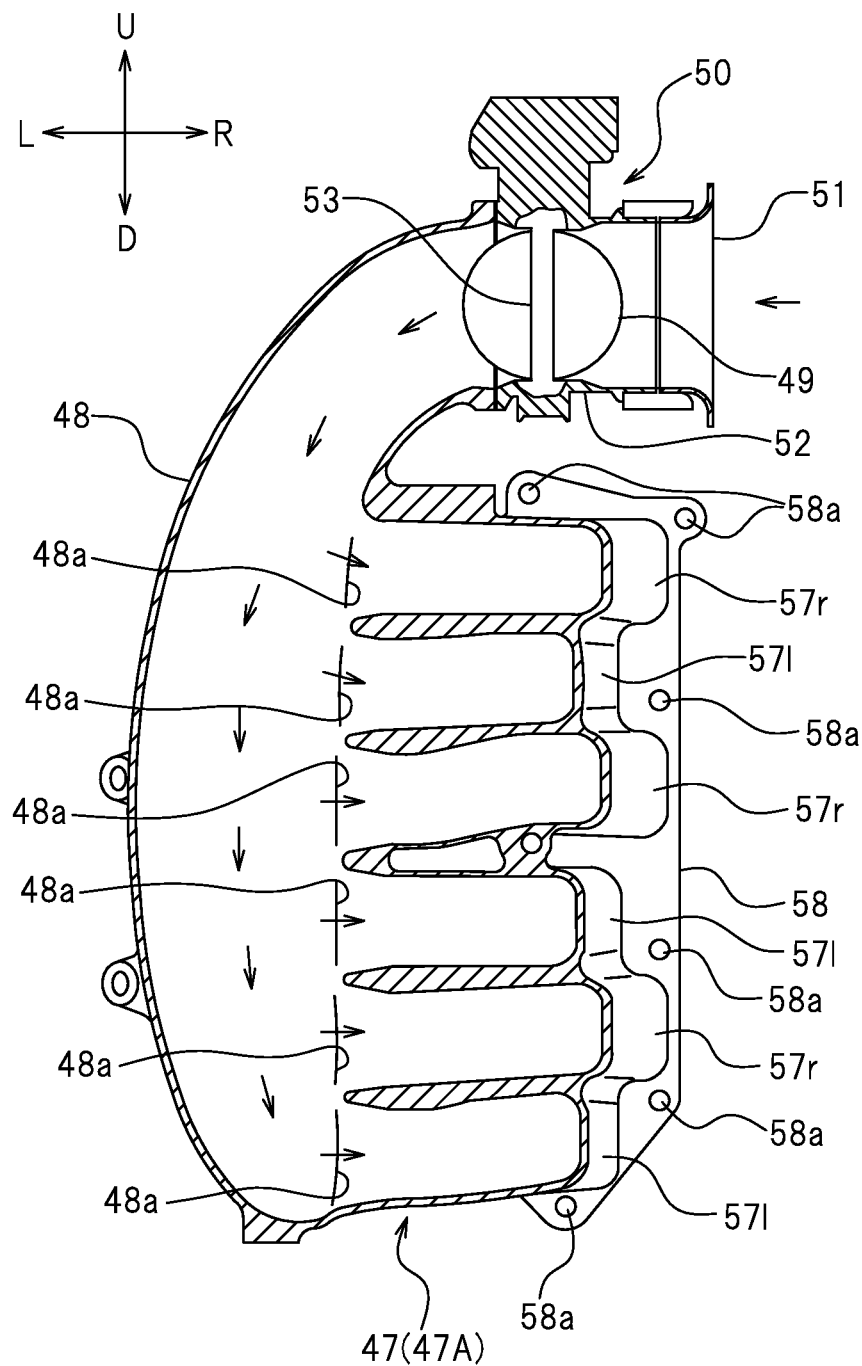

FIG. 9 is a vertical cross-sectional view of the throttle body 50, the surge tank 48 and the like as seen from the rear side. As shown in FIG. 9, the throttle body 50 includes a tubular portion 52 that is preferably substantially tubular-shaped and arranged to extend in the left-right direction, and a throttle shaft 53 extending in the vertical direction and supporting the throttle valve 49 such that the throttle valve 49 is rotatable. The throttle valve 49 rotates about the throttle shaft 53 and thus changes a flow path cross-sectional area size of the tubular portion 52. As the flow path cross-sectional area size of the tubular portion 52 is increased, the amount of the sucked air is increased and thus an engine output is increased. In contrast, as the flow path cross-sectional area size of the tubular portion 52 is decreased, the amount of the sucked air is decreased and thus the engine output is decreased. As shown in FIG. 5, the throttle body 50 is located at a center in the outboard motor width direction. A portion of the throttle body 50 is located in a vertical plane P1 including the center line L1.

As shown in FIG. 9, a right portion of the throttle body 50 is connected to a funnel 51. The funnel 51 is a member arranged to smooth the flow of the sucked air and expands rightward. The funnel 51 is opened rightward. As shown in FIG. 5, the funnel 51 is located to the right of the center line L1.

As shown in FIG. 9, the surge tank 48 is connected to a left portion of the throttle body 50. The surge tank 48 relaxes the change of intake pressure of the engine 8. In the present preferred embodiment, the throttle body 50 is directly connected to the surge tank 48. Alternatively, another member such as a duct or the like may be provided between the throttle body 50 and the surge tank 48, for example. More specifically, the throttle body 50 and the surge tank 48 may be connected to each other indirectly via a duct or the like.

The surge tank 48 preferably has a shape that is longer in the vertical direction, and the length thereof in the up-down direction is longer than the length thereof in the front-rear direction and also the length thereof in the left-right direction. As shown in FIG. 5, the length of the surge tank 48 in the up-down direction is approximately equal to the length of the cylinder head 30 in the up-down direction. As shown in FIG. 6, the length (represented by reference sign 48L) of the surge tank 48 in the left-right direction is shorter than a length 31L of the head cover 31 in the left-right direction.

As shown in FIG. 6, the surge tank 48 is located to the left of the centerline L1. The surge tank 48 is located rearward relative to the head cover 31 in the left bank 28L. The surge tank 48 is integrally provided with a boss 54. The boss 54 is secured preferably by a bolt 56, for example, to a boss 55t that is preferably integrally formed with the head cover 31. In this manner, a left portion of the surge tank 48 is secured to the head cover 31 in the left bank 28L.

The surge tank 48 is located between the head cover 31 in the left bank 28L and the cowling 16 (in more detail, the top cowl 14). A rear wall 48b of the surge tank 48 is arranged to be parallel or substantially parallel to an inner wall 16b of the cowling 16. In other words, the rear wall 48b of the surge tank 48 is arranged so as to correspond to the shape of the cowling 16. As a result, a gap between the rear wall 48b of the surge tank 48 and the inner wall 16b of the cowling 16 can be made small. A front wall 48f of the surge tank 48 is preferably arranged parallel or substantially parallel to the head cover 31. In other words, the front wall 48f of the surge tank 48 is arranged so as to correspond to the shape of the head cover 31. As a result, a gap between the head cover 31 and the front wall 48f of the surge tank 48 can be made small. Therefore, the surge tank 48 can be guaranteed to have a large volume while interference of the surge tank with the cowling 16 and the head cover 31 is avoided. According to the present preferred embodiment, the surge tank 48 having a sufficient volume can be located in a space enclosed by the center line L1, the cowling 16 and the left bank 28L as seen in a plan view.

As shown in FIG. 6, in a horizontal cross-section, the interior of the surge tank 48 becomes wider rightward, specifically, toward the intake manifold 47.

As shown in FIG. 9, the air sucked into the surge tank 48 flows generally downward in the surge tank 48. An area size of the horizontal cross-section of the surge tank 48, specifically, the flow path cross-sectional area size, first increases and then decreases downward. The flow path cross-sectional area size of the surge tank 48 is maximum in the vicinity of a position between the upper three cylinders and the lower three cylinders of the engine 8 (in other words, at a center position of the engine 8 in the up-down direction). In order to smooth the flow of the air, the surge tank 48 preferably has a shape such that a cross-sectional area size is continuously changed downward. In this example, the surge tank 48 preferably has a streamline shape, for example. It should be noted that the specific shape of the surge tank 48 is not limited, and the surge tank 48 may have a shape with which the flow path cross-sectional area size changes step by step, for example. Alternatively, the surge tank 48 may have a shape having a uniform flow path cross-sectional area size.

The surge tank 48 preferably includes six outlets 48a, for example, arranged in the up-down direction. The outlets 48a are each opened rightward.

The surge tank 48 is connected to the intake manifold 47. As shown in FIG. 8, the intake manifold 47 preferably includes two members assembled together, specifically, an upstream portion 47A and a downstream portion 47B. The upstream portion 47A preferably is integrally formed with the surge tank 48. The surge tank 48 and the upstream portion 47A preferably are integrally formed of a synthetic resin. It should be noted that the material of the surge tank 48 and the upstream portion 47A is not specifically limited, and the surge tank 48 and the upstream portion 47A may be formed of a metal material such as an aluminum alloy or other suitable material, for example. The downstream portion 47B preferably is formed of a metal material, and is preferably formed of, in this example, an aluminum alloy. It should be noted that the material of the downstream portion 47B is not specifically limited, either. The upstream portion 47A and the surge tank 48 may be separate members. Alternatively, the intake manifold 47 may be defined by a single unitary member. There is no specific limitation on the material of the surge tank 48 or the material of the intake manifold 47.

As shown in FIG. 9, the upstream portion 47A of the intake manifold 47 preferably includes a total of six, for example, intake pipes 57r and 57l arranged in the vertical direction. The upstream portion 47A is integrally connected to the surge tank 48 such that the intake pipes 57r and 57l are respectively connected to the outlets 48a of the surge tank 48. The first, third and fifth intake pipes 57r counted from above supply air to the intake ports 37 in the right bank 28R. The second, fourth and sixth intake pipes 57l counted from above supply air to the intake ports 37 in the left bank 28R. The intake pipes 57r and the intake pipes 57l are curved in different manners so as to supply air to the respective intake ports 37 smoothly. In more detail, as shown in FIG. 8, as seen in a plan view, an upstream end of intake pipes 57l is offset rearward with respect to an upstream end of the intake pipes 57r, and a downstream end of the intake pipes 57l is offset leftward with respect to a downstream end of the intake pipes 57r. A center 57le of the downstream end of the intake pipes 57l is located to the left of the center line L1. A center 57re of the downstream end of the intake pipes 57r is located to the right of the center line L1.

As shown in FIG. 9, a flange 58 including a plurality of holes 58a is provided at a downstream end of the upstream portion 47A. Although not shown, a flange similar to the flange 58 is provided also in the downstream portion 47B of the intake manifold 47. A bolt is inserted into each hole 58a, and both of the flanges are linked to each other preferably via the bolts, for example.

As shown in FIG. 8, the downstream portion 47B of the intake manifold 47 includes an intake pipe 59r connected to each intake pipe 57r and an intake pipe 59l connected to each intake pipe 57l. The downstream portion 47B is located forward with respect to the upstream portion 47A. The intake pipe 59r connects the intake pipe 57r and the intake port 37 in the right bank 28R to each other. The intake pipe 59l connects the intake pipe 57l and the intake port 37 in the left bank 28L to each other. At downstream ends of the intake pipes 59r and 59l, flanges 59s are provided. Also at upstream ends of intake ports 37, similar flanges are provided. Both of the flanges 59s are linked to each other preferably by a bolt (not shown), for example.

The intake pipe 59l extends in an oblique rearward and rightward direction from the cylinder head 30 in the left bank 28L. The intake pipe 59r extends in an oblique rearward and leftward direction from the cylinder head 30 in the right bank 28R. In order to guide air smoothly from the intake pipes 59l and 59r to the intake ports 37, the downstream end portions of the intake pipes 59l and 59l are each located on a line extended from the upstream end portion of the corresponding intake port 37. The downstream end portions of the intake pipes 59l and 59l and the upstream end portions of the intake ports 37 are located such that centers thereof match each other respectively.

Figure 10:
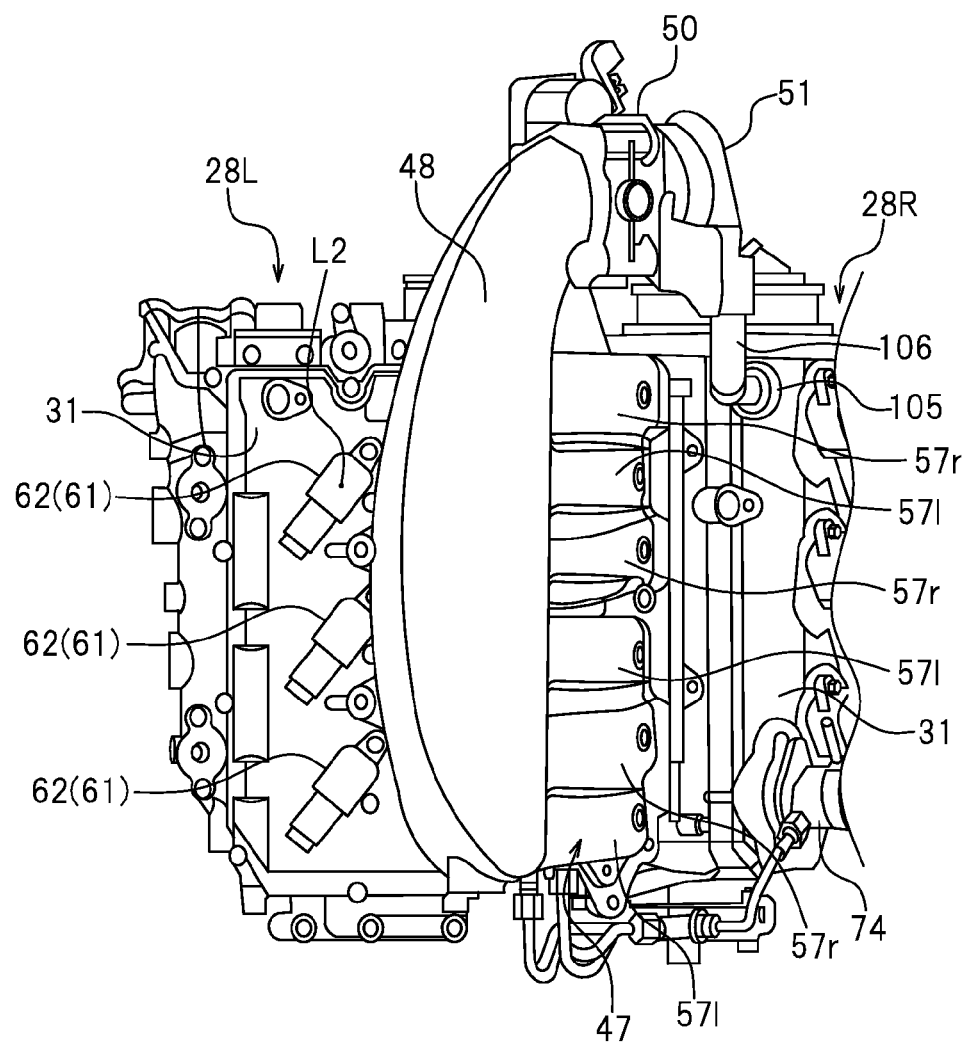
FIG. 10 is a view of a left bank as seen from an obliquely rearward position in the direction of a cylinder axis line.

FIG. 10 shows the left bank 28L, the surge tank 48 and the like as seen from a position which is obliquely rearward and leftward thereto in the direction of the cylinder axis line L2 in the left bank 28L. As shown in FIG. 10, as seen in the direction of the cylinder axis line L2, the lowermost connector 62 does not overlap the surge tank 48. Therefore, the lowermost connector 62, together with the ignition plug 61 connected thereto, can be pulled out from the cylinder head 30 and the head cover 31 without being obstructed by the surge tank 48. Similarly, the lowermost connector 62 and the ignition plug 61 can be inserted into the cylinder head 30 and the head cover 31 without being obstructed by the surge tank 48. Thus, maintenance can be performed easily.

The entirety of the ignition plug 61 and the connector 62 will be referred to as an "ignition device". In the present preferred embodiment, preferably only a portion of the plurality of ignition devices is located so as not to overlap the surge tank 48 as seen in the direction of the cylinder axis line L2. It should be noted that the size or the shape of the surge tank 48 can be changed such that none of the ignition devices overlaps the surge tank 48 as seen in the direction of the cylinder axis line L2. In this manner, the ease of maintenance of the ignition devices can be further improved.

As shown in FIG. 2, the outboard motor 1 includes, as the exhaust system to discharge the exhaust gas from the engine 8, exhaust manifolds 63 each preferably integrally formed with the corresponding cylinder head 30, catalyst cases 65 each including a catalyst 64 accommodated therein, top exhaust pipes 66 each arranged to connect the corresponding exhaust manifold 63 and a top end portion of the corresponding catalyst case 65 to each other, bottom exhaust pipes 67 (see FIG. 11) each arranged to connect a bottom end portion of the corresponding catalyst case 65 and a side portion of a bottom portion of the corresponding cylinder block 29 to each other, and an exhaust path 68 (see FIG. 1) arranged to discharge the exhaust gas from the bottom exhaust pipes 67 to the outside of the outboard motor 1. The top exhaust pipes 66, the catalyst cases 65 and the bottom exhaust pipes 67 are separate members, but a portion, or all of, these members may be integrated together. In the following description, the top exhaust pipe 66, the catalyst case 65 and the bottom exhaust pipe 67 will be collectively referred to as an "exhaust pipe 120".

Figure 11:
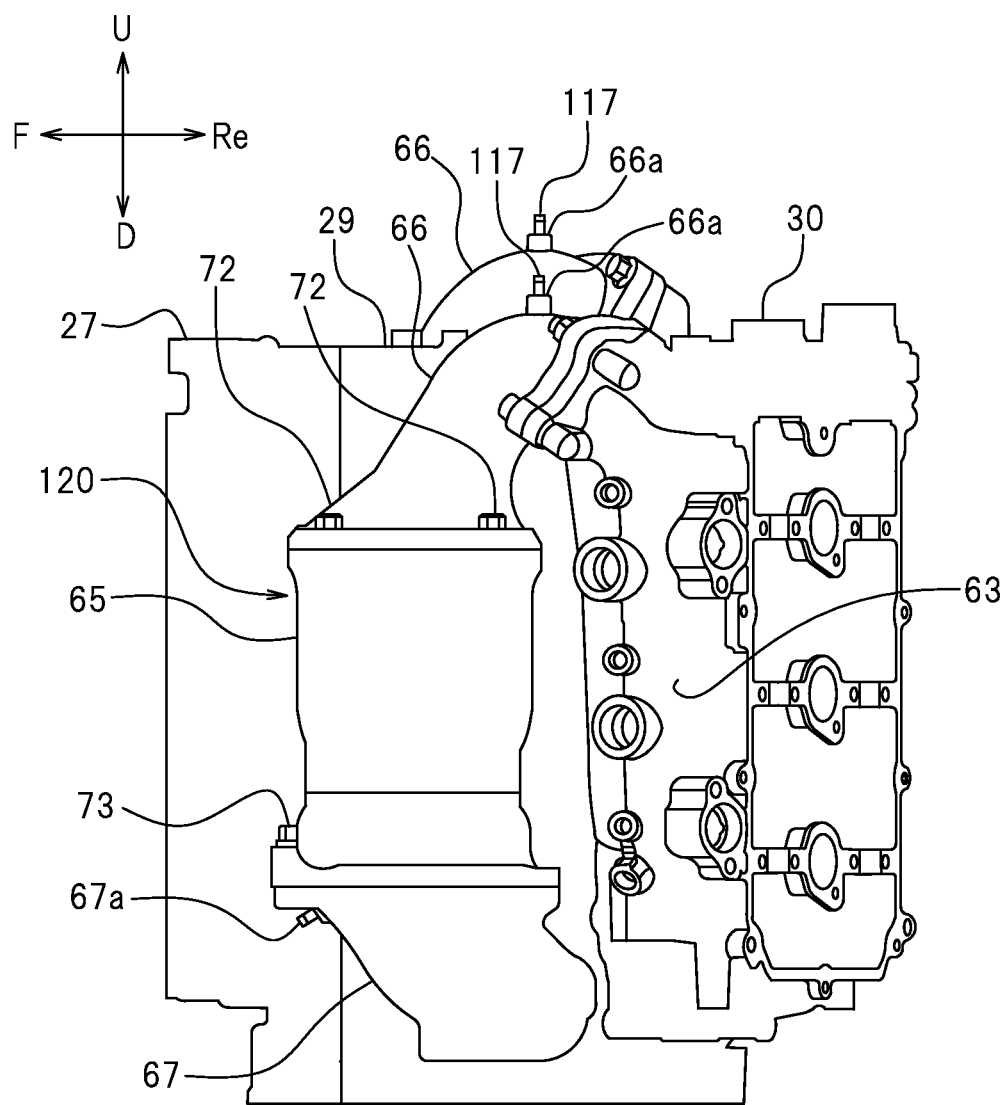
Figure 12:
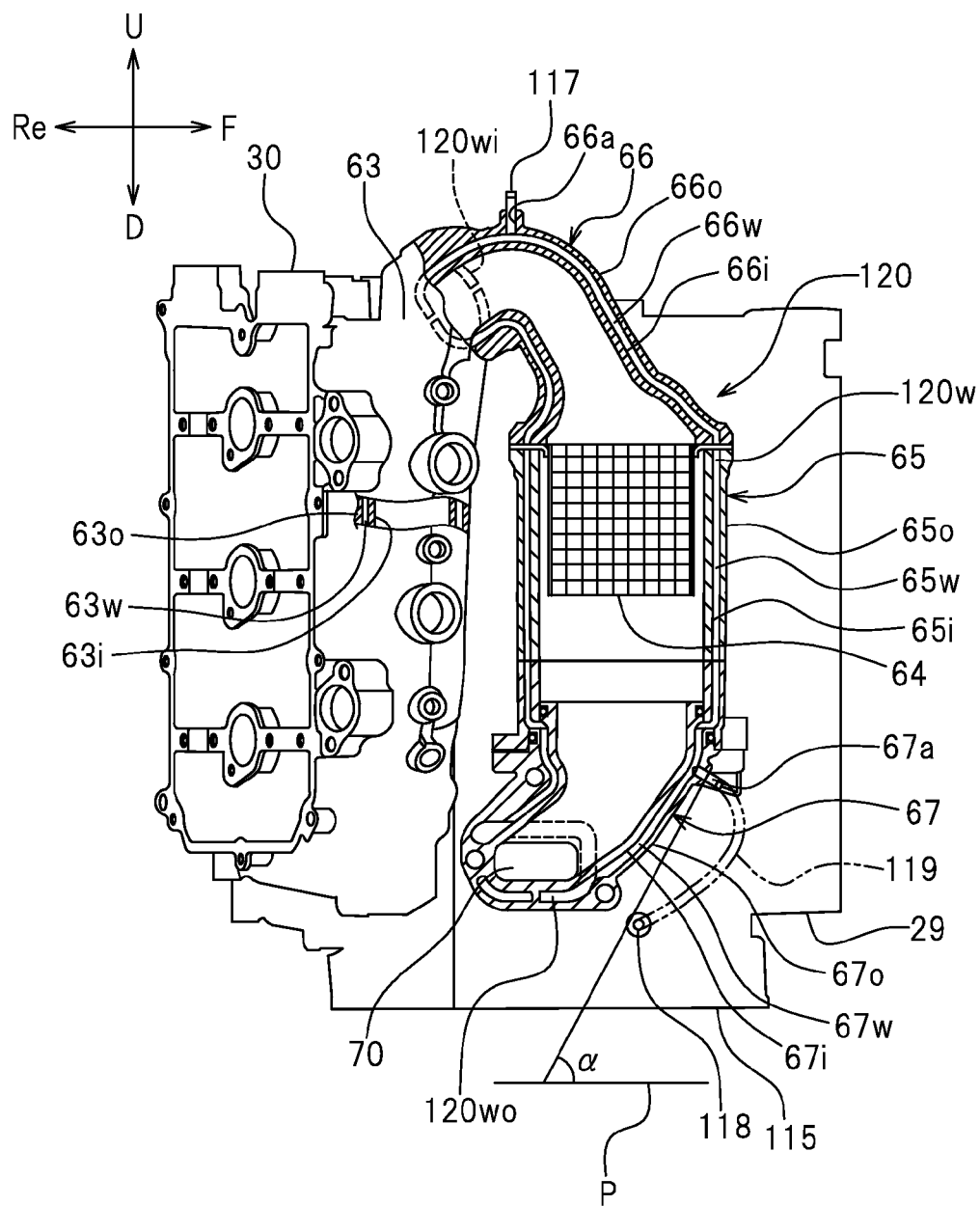
FIG. 12 is a partially-cut right side view of the engine which shows a portion of the exhaust manifold and a portion of the exhaust pipe.

As shown in FIG. 2, the exhaust manifolds 63 are respectively located to the left of the exhaust port 38 in the left bank 28L and to the right of the exhaust port 38 in the right bank 28R. As shown in FIG. 11, the exhaust manifold 63 extends upward. As shown in FIG. 12, the exhaust manifold 63 includes an inner pipe 63i and an outer wall 63o which encloses a circumference of the inner pipe 63i and is integral with the cylinder head 30. The exhaust flows in the inner pipe 63i. Between the inner pipe 63i and the outer wall 63o integral with the cylinder head 30, a water jacket 63w in which the cooling water flows is provided. A side surface of the inner pipe 63i of the exhaust manifold 63 includes a plurality of inlets (not shown) arranged in the vertical direction. The exhaust port 38 is communicated to the inlets. The exhaust gas, discharged from the exhaust port 38 to the exhaust manifold 63 via the inlets, flows upward in the inner pipe 63i of the exhaust manifold 63 and is joined with the exhaust gas from the other exhaust port 38.

As described above, the exhaust manifold 63 preferably is integrally formed with the cylinder head 30 in the present preferred embodiment, but the exhaust manifold 63 and the cylinder head 30 may be separate members. The exhaust manifold 63 and the cylinder head 30, which are separate members, may be linked to each other preferably by a bolt or other joining member, for example.

As shown in FIG. 12, the top exhaust pipe 66 is a so-called double tube pipe, and includes an inner pipe 66i and an outer pipe 66o arranged to enclose a circumference of the inner pipe 66i. The exhaust gas flows in the inner pipe 66i. Between the inner pipe 66i and the outer pipe 66o, a water jacket 66w in which the cooling water flows is provided. As shown in FIG. 2, each top exhaust pipe 66 is located along the cylinder block 29 as seen in a plan view. Specifically, the left top exhaust pipe 66 extends in an oblique rearward and leftward direction, like the cylinder block 29 in the left bank 28L. The right top exhaust pipe 66 extends in an oblique rearward and rightward direction, like the cylinder block 29 in the right bank 28R. As shown in FIG. 12, a bottom end portion of the top exhaust pipe 66 expands downward.

As shown in FIG. 11, a top end portion of the catalyst case 65 is secured to the bottom end portion of the top exhaust pipe 66 preferably by bolts 72, for example. As shown in FIG. 12, the catalyst case 65 preferably includes a double tube pipe including an inner pipe 65i and an outer pipe 65o. The outer pipe 65o is located concentrically with the inner pipe 65i and encloses a circumference of the inner pipe 65i. The exhaust gas flows in the inner pipe 65i. Between the inner pipe 65i and the outer pipe 65o, a water jacket 65w in which the cooling water flows is provided. Inside the inner pipe 65i, the catalyst 64 is located. As shown in FIG. 6, each catalyst case 65 preferably has a circular or substantially circular cross-section, and each catalyst 64 also preferably has a circular or substantially circular cross-section. It should be noted that the cross-sectional shape of the catalyst 64 is not specifically limited, and may be appropriately changed to be suitable to the cross-sectional shape of the catalyst case 65. The catalyst 64 is not limited to being located in the inner pipe 65i and being one in number. Two or more catalysts 64 may be provided, for example.

As shown in FIG. 6, as seen in a plan view, each catalyst case 65 is located outward relative to the V-bank. The left catalyst case 65 is located to the left of the left bank 28L, and the right catalyst case 65 is located to the right of the right bank 28R. As seen in a plan view, each catalyst case 65 is located in an area enclosed by the crankcase 27, the cylinder block 29, the cylinder head 30 and a side wall of the cowling 16.

As seen in a plan view, a center 65c of each catalyst case 65 is located at a position forward with respect to a rear end 29b of the cylinder block 29 and rearward with respect to a front end 27f (see FIG. 2) of the crankcase 27. The center 65c of the catalyst case 65 is located rearward relative to the center 13a of the crankshaft 13. In the case where the cross-section of the catalyst case 65 is not circular, the center of gravity of the catalyst case 65 may be regarded as the center thereof. A front end 65f of the catalyst case 65 is located rearward relative to the front end 27f of the crankcase 27. A rear end 65b of the catalyst case 65 is located rearward relative to the rear end 27b of the crankcase 27.

As shown in FIG. 6, an outermost end 65oe of each catalyst cast 65 in the outboard motor width direction is located at substantially the same position as that of an outermost end 30oe of the cylinder head 30 in the outboard motor width direction. The outermost end 65oe of the catalyst cast 65 in the outboard motor width direction is located outward relative to an outermost end 29oe of the cylinder block 29 in the outboard motor width direction, and an innermost end 65ie of the catalyst cast 65 in the outboard motor width direction is located inward relative to the outermost end 29oe of the cylinder block 29 in the outboard motor width direction. The center 65c of the catalyst case 65 is located outward relative to the outermost end 29oe of the cylinder block 29 in the outboard motor width direction.

As shown in FIG. 3, the length of the catalyst case 65 in the vertical direction is longer than the diameter of each cylinder 32. As shown in FIG. 11, the length of the catalyst case 65 in the vertical direction is about half of the length of the cylinder head 30 in the vertical direction. As shown in FIG. 12, the length of the catalyst 64 in the catalyst case 65 in the vertical direction is equal to, or longer than, the diameter of each cylinder 32.

As shown in FIG. 12, the bottom exhaust pipe 67 is also a double tube pipe, and includes an inner pipe 67i and an outer pipe 67o. The exhaust gas flows in the inner pipe 67i. Between the inner pipe 67i and the outer pipe 67o, a water jacket 67w in which the cooling water flows is provided. A top end portion of the bottom exhaust pipe 67 expands upward. As shown in FIG. 11, the top end portion of the bottom exhaust pipe 67 is secured to a bottom end portion of the catalyst case 65 by a bolt 73, for example. As shown in FIG. 12, the side portion of the bottom portion of the cylinder block 29 includes a flow-in opening 70 opened outward in the outboard motor width direction. A bottom end portion of the exhaust pipe 67 is secured to the side portion of the bottom portion of the cylinder block 29 so as to face the flow-in opening 70.

The flow path cross-sectional area size of the inner pipe 65i of the catalyst case 65 is larger than the flow path cross-sectional area size of an intermediate portion of the inner pipe 66i of the top exhaust pipe 66 and is also larger than the flow path cross-sectional area size of an intermediate portion of the inner pipe 67i of the bottom exhaust pipe 67. Specifically, in a portion extending from the exhaust manifold 63 to the cylinder head 30, the flow path cross-sectional area size of the path for discharge first increases and then decreases. The catalyst 64 is located in an area of the above-described path at which the flow path cross-sectional area size is increased. In the present preferred embodiment, the catalyst 64 is located in an area of the above-described path which has the largest flow path cross-sectional area size.

Figure 13:
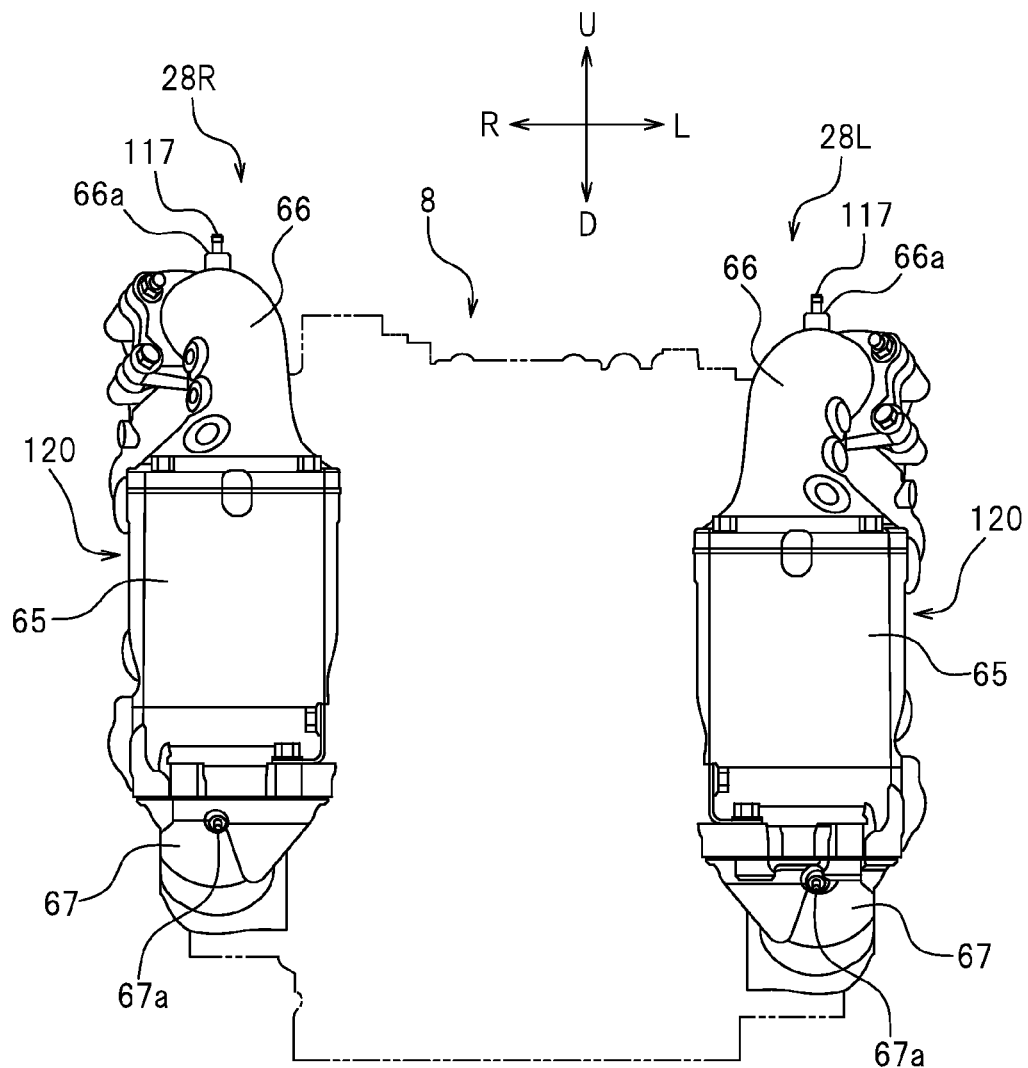
FIG. 13 is a front view of the exhaust pipe.

As described above with reference to FIG. 7, the cylinders 32 in the right bank 28R are offset upward with respect to the cylinders 32 in the left bank 28L. As shown in FIG. 13, in correspondence with the offset, the exhaust pipe 120 in the right bank 28R is offset upward with respect to the exhaust pipe 120 in the left bank 28L. Specifically, the top exhaust pipe 66 in the right bank 28R is offset upward with respect to the top exhaust pipe 66 in the left bank 28L, the catalyst case 65 in the right bank 28R is offset upward with respect to the catalyst case 65 in the left bank 28L, and the bottom exhaust pipe 67 in the right bank 28R is offset upward with respect to the bottom exhaust pipe 67 in the left bank 28L. These elements in the left bank 28L and these elements in the right bank 28R may be offset in the opposite manner.

As shown in FIG. 12, in a bottom portion of the cylinder block 29, an attachment block 115, which is attachable to, for example, a support member (not shown) arranged to support the cylinder block 29, is provided. The attachment block 115 defines a portion of the cylinder block 29. Although not shown, inside the attachment block 115, an exhaust gas path is arranged to extend from the flow-in opening 70 to the bottom end portion of the cylinder block 29. As shown in FIG. 1, the exhaust path 68 arranged to discharge the exhaust gas from the exhaust pipe 120 to the outside of the outboard motor 1 includes the above-mentioned exhaust gas path in the attachment block 115, an exhaust gas path in the upper case 17 and the lower case 18, and an exhaust path provided in the propeller shaft 11. The exhaust gas is discharged into the water through the exhaust path 68.

As shown in FIG. 2, the outboard motor 1 includes, as the fuel supply system to supply fuel to the engine 8, the fuel filter 19, the vapor separator tank 20, and the high-pressure fuel pump 74.

As schematically shown in FIG. 1, the hull 3 is provided with a fuel tank 76 having fuel stored therein. As shown in FIG. 2, the fuel filter 19 is connected to the fuel tank 76 via a fuel hose 75. Although not shown, inside the hull 3 or the outboard motor 1, a pump arranged to transport fuel from the fuel tank 76 toward the fuel filter 19 (hereinafter, this pump will be referred to as a "low-pressure fuel pump") is provided. The fuel filter 19 includes a cylindrical or substantially cylindrical case 19a (see FIG. 4) extending upward and a filter element (not shown) provided in the case 19a. As shown in FIG. 2, the fuel filter 19 is located between a front wall of the top cowl 14 of the cowling 16 and the crankcase 27 of the engine 8. The fuel filter 19 is located to the right of the center line L1.

The vapor separator tank 20 is connected to the fuel filter 19 via a fuel hose 77. The fuel transported from the fuel tank 76 by the low-pressure fuel pump is purified by passing through the fuel filter 19 and flows into the vapor separator tank 20.

The vapor separator tank 20 stores the fuel supplied from the fuel tank 76 and also separates vapor or air of the fuel from liquid fuel. The vapor separator tank 20 includes a tank 20a longer in the vertical direction (see FIG. 3), a pump (not shown) located inside the tank 20a (hereinafter, this pump will be referred to as an "in-tank high-pressure pump"), a float (not shown) located inside the tank 20a, and a valve associated with the float. When the level of the liquid surface of the fuel in the tank 20a becomes equal to or higher than a prescribed level, the valve is closed and the flow of the fuel into the vapor separator tank 20 is stopped. By contrast, when the level of the liquid surface of the fuel in the tank 20a becomes lower than the prescribed level, the valve is opened and the fuel flows into the vapor separator tank 20.

As shown in FIG. 2, the vapor separator tank 20 is located to the left of the center line L1 and is located obliquely leftward and forward with respect to the crankcase 27. The vapor separator tank 20 is located rear to the fuel filter 19.

The high-pressure fuel pump 74 is attached to the head cover 31 in the right bank 28R. The high-pressure fuel pump 74 and the vapor separator tank 20 are connected to each other by a fuel hose 78. The fuel stored in the tank 20a of the vapor separator tank 20 is supplied to the high-pressure fuel pump 74 via the fuel hose 78 by the in-tank high-pressure fuel pump in the vapor separator tank 20.

An upstream end of the fuel hose 78 is connected to the vapor separator tank 20. As shown in FIG. 2 through FIG. 4, a portion of the fuel hose 78 is located below the exhaust pipe 120. In more detail, the fuel hose 78 passes below the exhaust pipe 120 and extends rearward or obliquely rearward. Alternatively, a portion of the fuel hose 78 may be located above the exhaust pipe 120 or above the cylinder block 29 or the like, instead of below the exhaust pipe 120.

Upstream with respect to the high-pressure fuel pump 74, the pressure of the fuel is not very high. Therefore, each of the fuel hose 75, the fuel hose 77 and the fuel hose 78 does not need to have a high pressure resistance. The material of each of the fuel hose 75, the fuel hose 77 and the fuel hose 78 is not specifically limited, and may be, for example, rubber, a resin or other suitable material, for example. The fuel hose 75, the fuel hose 77 and the fuel hose 78 may be each replaced with a pipe preferably formed of a resin, a metal material or other suitable material, for example.

As shown in FIG. 6, the high-pressure fuel pump 74 is a cam-driven fuel pump and is driven by the intake cam shaft 43 in the right bank 28R. The high-pressure fuel pump 74 is located to the right of the center line L1. Since the surge tank 48 is located to the left of the center line L1, it can be considered that the high-pressure fuel pump 74 is located on the left side or the right side with respect to the center line L1, which is the opposite side (right side) to the side where the surge tank 48 is located (left side). The high-pressure fuel pump 74 is located to the left of the cylinder axis line L2 in the right bank 28R. In other words, the high-pressure fuel pump 74 is located inward relative to the cylinder axis line L2 in the right bank 28R in the outboard motor width direction. As seen in a plan view, a gap between the head cover 31 and the cowling 16 in the right bank 28R is larger on the left side than on the right side with respect to the cylinder axis line L2 in the right bank 28R. Between the left side with respect to the cylinder axis line L2 and the head cover 31 in the right bank 28R, an open space is provided. In order to effectively use this space, the high-pressure fuel pump 74 is located in this space.

As shown in FIG. 5, the high-pressure fuel pump 74 is attached to a bottom portion of the head cover 31 in the right bank 28R. As described above, the cylinders 32 in the right bank 28R are offset upward with respect to the cylinders 32 in the left bank 28L. In order to effectively use the open space provided by such offset, the high-pressure fuel pump 74 is attached to a bottom portion of the left bank 28L or the right bank 28R, in which the cylinders 32 are offset upward. The head cover 31 includes an attachment section 31k provided therein to which the high-pressure fuel pump 74 is attachable. The head cover 31 is preferably formed of a resin and is easily molded, for example. According to the present preferred embodiment, the attachment section 31k for the high-pressure fuel pump 74 can be easily formed in the head cover 31.

Figure 14:
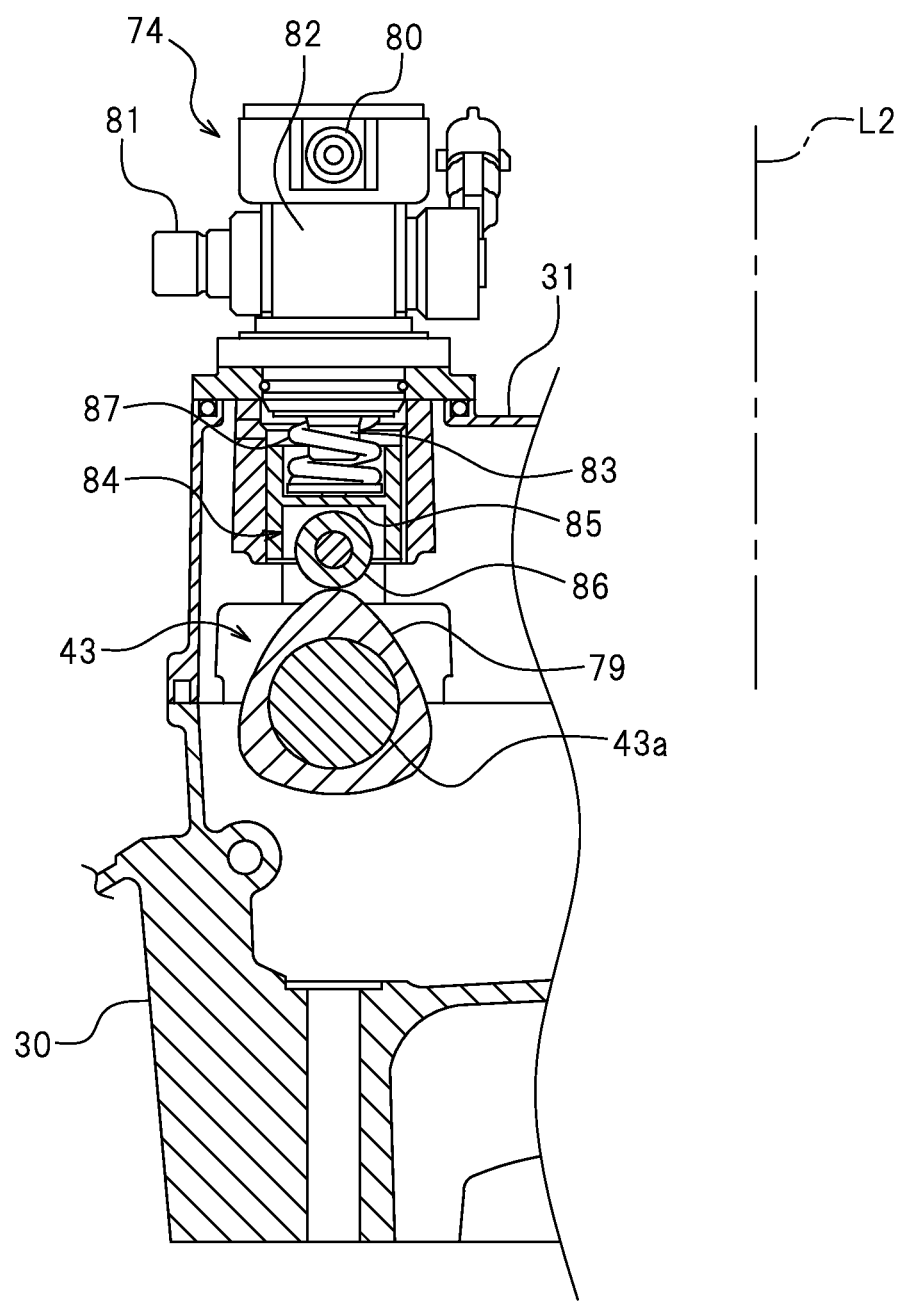
FIG. 14 is a horizontal cross-sectional view of a high-pressure fuel pump.
Figure 15:
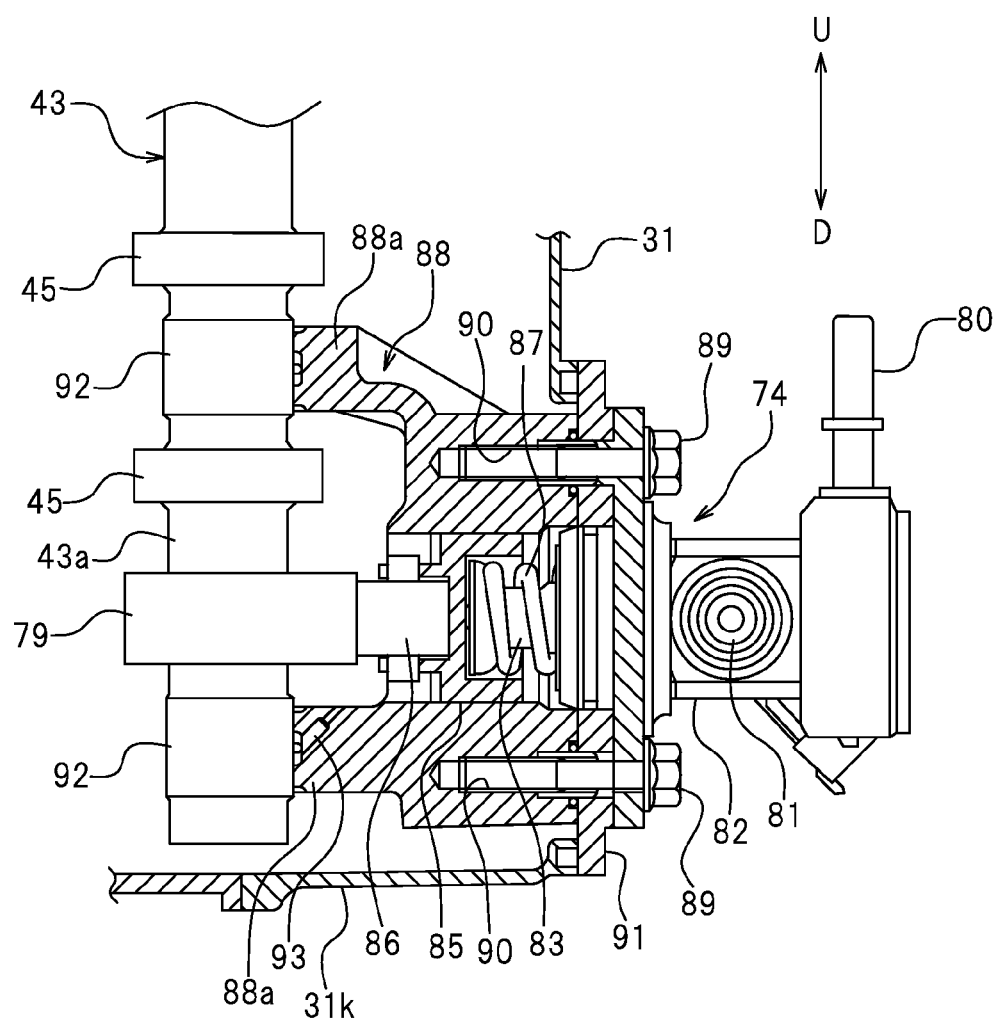
FIG. 15 is a vertical cross-sectional view of the high-pressure fuel pump.

FIG. 14 is a horizontal cross-sectional view of the high-pressure fuel pump 74, and FIG. 15 is a vertical cross-sectional view of the high-pressure fuel pump 74. The high-pressure fuel pump 74 includes an intake section 80 arranged to suck in fuel, an ejection section 81 arranged to eject fuel, and a pump main body 82. Although not shown, the following components are preferably provided inside the pump main body 28: a pressure chamber partially partitioned by a diaphragm, an intake check valve arranged to permit the fuel to flow only in a direction from the intake section 80 toward the pressure chamber, and an ejection check valve arranged to permit the fuel to flow only in a direction from the pressure chamber toward the ejection section 81. By a reciprocating motion of the diaphragm in the up-down direction in FIG. 14, the fuel is sucked into the pressure chamber from the intake section 80 and is ejected from the pressure chamber to the ejection section 81.

In the pump main body 82, a rod 83 including a rear end portion (top end portion in FIG. 14) which is coupled to the diaphragm is provided. The rod 83 is urged forward (downward in FIG. 14) by a coil spring 87. A front end portion (bottom end portion in FIG. 14) of the rod 83 is provided with a lifter 84. The lifter 84 includes a frame 85 in contact with the rod 83 and a roller 86 rotatably supported at a front portion of the frame 85. The rod 83 and the lifter 84 are arranged and operative to make a reciprocating motion integrally in the up-down direction in FIG. 14. The rod 83 and the lifter 84 are arranged and operative to make a reciprocating motion in a direction parallel or substantially parallel to the cylinder axis line L2.

The intake cam shaft 43 is provided with a pump driving cam 79 to drive the high-pressure fuel pump 74. The pump driving cam 79 may be integrally formed with a cam shaft main body 43a, but in the present preferred embodiment, the pump driving cam 79 preferably is separate from the cam shaft main body 43a. The pump driving cam 79 is preferably press-fit into the cam shaft main body 43a. The pump driving cam 79 may preferably be made of a material different from that of the cam shaft main body 43a. The material of the pump driving cam 79 is not specifically limited. For example, a sintered material, cast iron (ferrum casting ductile (FCD), etc.) or other suitable material is preferably usable. The roller 86 of the lifter 84 is in contact with the cam 79. When the cam 79 is rotated along with the rotation of the intake cam shaft 43, the lifter 84 in contact with the cam 79 makes a reciprocating motion. Along with this, the rod 83 makes a reciprocating motion, and the diaphragm is displaced in repetition. As a result, the fuel sucked from the intake section 80 is increased in pressure by the pressure chamber and is ejected from the ejection section 81 as high-pressure fuel.

Figure 16:
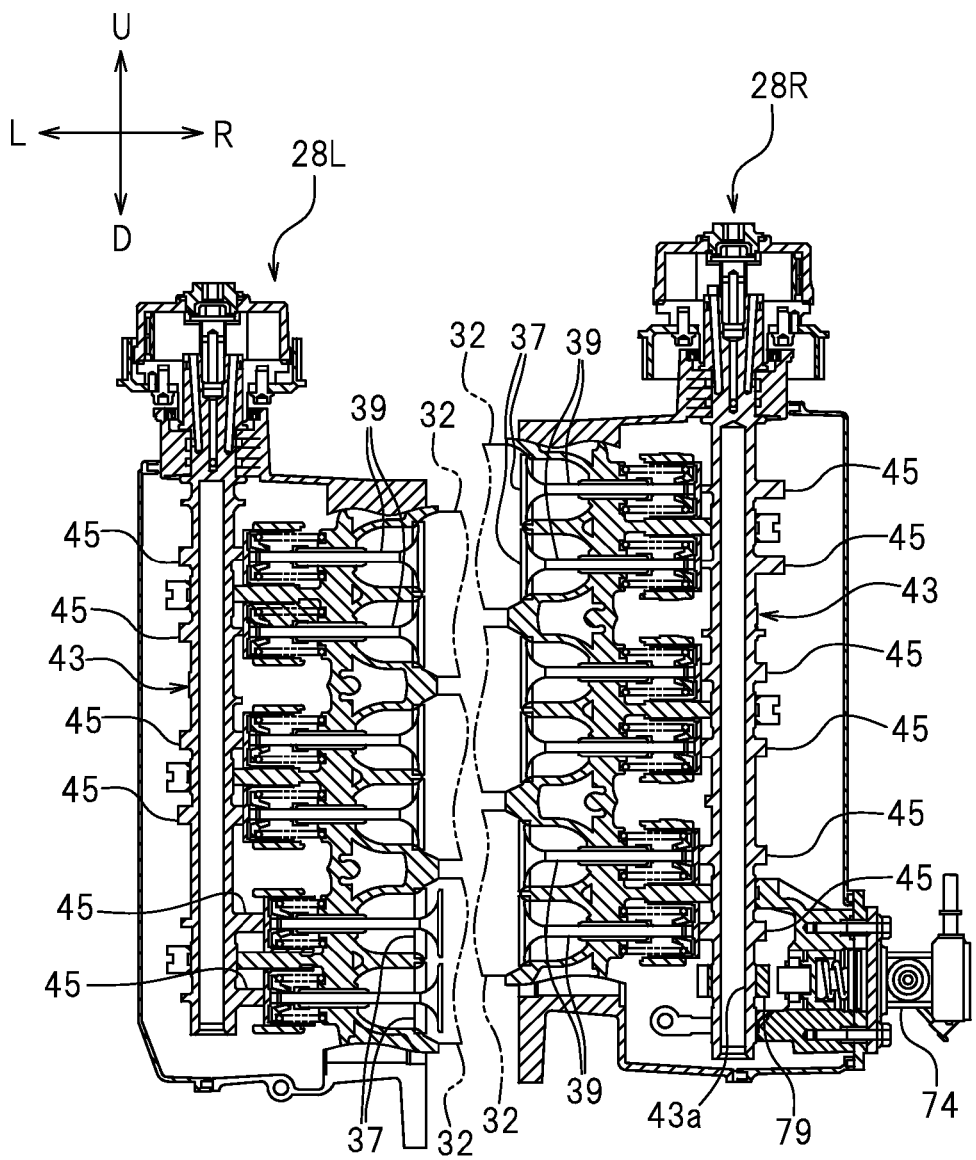
FIG. 16 is a vertical cross-sectional view of a portion of the left bank and a portion of a right bank.

As shown in FIG. 16, the pump driving cam 79 is provided at a bottom portion of the intake cam shaft 43 in the right bank 28R. The engine 8 according to the present preferred embodiment preferably includes two intake ports 37 and two exhaust ports 38 for each of the cylinders 32, for example. In the right bank 28R, the three cylinders 28 are provided, and the intake camshaft 43 is provided with six intake cams 45 arranged in the up-down direction. The cam 79 is provided at a position lower than these six intake cams 45. Specifically, the cam 79 is located lower than the lowermost cam among of the intake cams 45. Therefore, in the case where a member separate from the cam shaft main body 43a is fit into the camshaft main body 43a to define the cam 79, the work of fitting the separate member can be performed easily. It should be noted that the cam 79 is not limited to being a separate member and may be integrally formed with the cam shaft main body 43a.

As shown in FIG. 15, inside the head cover 31, a cam cap 88 is located as a support arranged to support the high-pressure fuel pump 74. The cam cap 88 includes a plurality of holes 90 into which bolts 89 are preferably inserted. The high-pressure fuel pump 74 is put on the cam cap 88 with a plate 91 being interposed therebetween. The high-pressure fuel pump 74, together with the plate 91, is secured to the cam cap 88 preferably by the bolts 89, for example. In this manner, the high-pressure fuel pump 74 is secured to the head cover 31 via the cam cap 88.

In a front portion of the cam cap 88 (left portion in FIG. 15), a bearing 88a to support the intake cam shaft 43 is arranged such that the intake cam shaft 43 is rotatable. The bearing 88a includes an oil supply path 93 provided therein to supply a lubricant. Bearings 92 are provided between the lowermost intake cam 45 and second-to-the-lowermost cam 45 provided to the intake cam shaft 43, and also below the pump driving cam 79. The bearings 92 may be each provided by causing a portion of the cam shaft main body 43a to have a larger diameter than the rest thereof, or by inserting a bearing member separate from the cam shaft main body 43a. Since the bearing 92 below the cam 79 is located at the lowermost end of the intake cam shaft 43, the separate bearing member can be inserted easily.

Although not shown in FIG. 15 or the like, a cover arranged to cover the high-pressure fuel pump 74 may be provided. Specifically, a portion of the high-pressure fuel pump 74 which is located outward relative to the head cover 31 may be covered with the cover.

Figure 17:
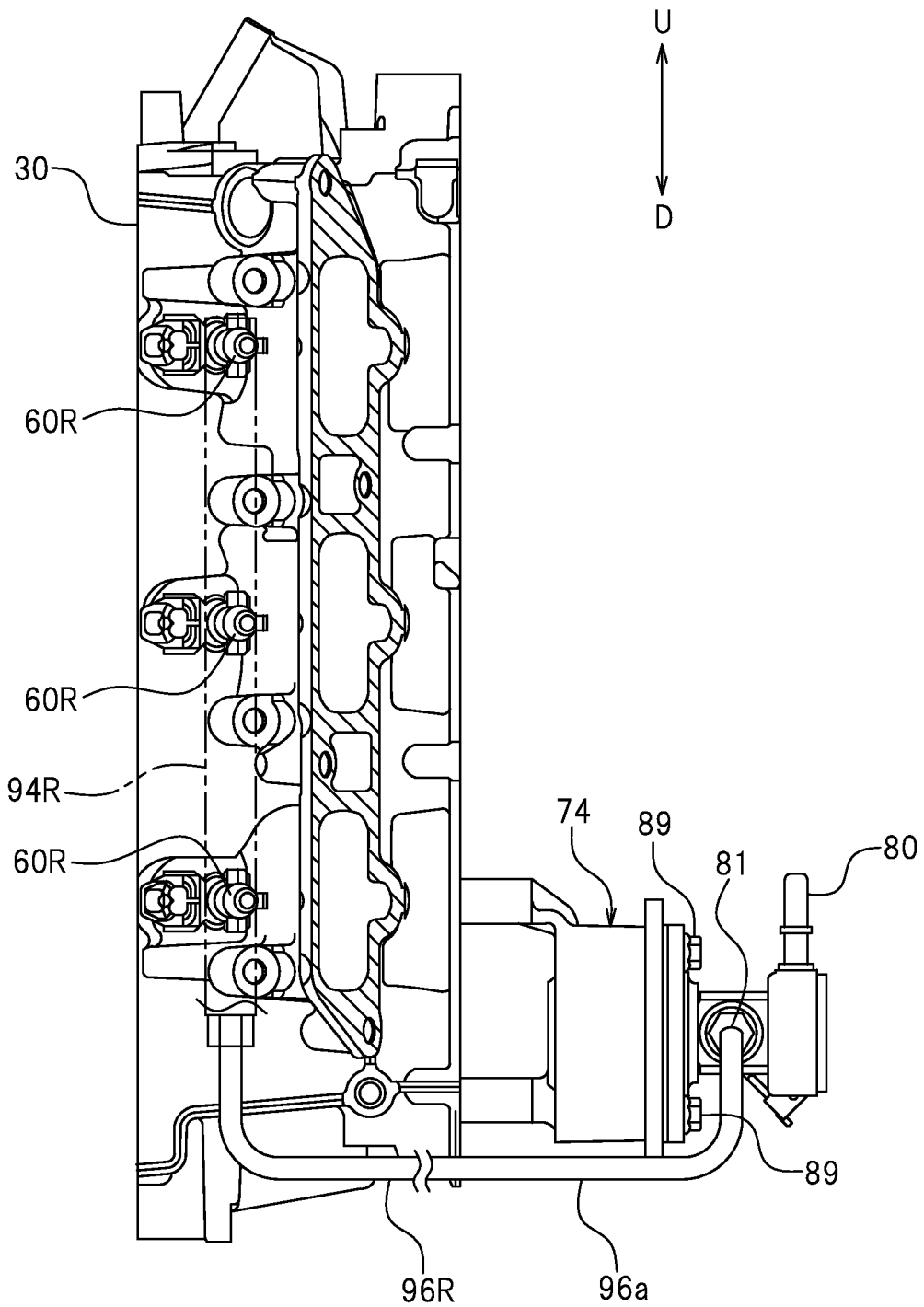

As shown in FIG. 8, to the right of the left bank 28L, a fuel supply rail 94L arranged to supply fuel to all the fuel injection devices 60L in the left bank 28L is provided. To the left of the right bank 28R, a fuel supply rail 94R arranged to supply fuel to all the fuel injection devices 60R in the right bank 28R is provided. The fuel supply rails 94L and 94R are fuel pipes arranged to supply fuel to the fuel injection devices 60L and 60R, respectively. As shown in FIG. 17, the fuel supply rail 94R extends in the vertical direction and is connected to each of the fuel injection devices 60R in the right bank 28R. Similarly, the fuel supply rail 94L extends in the vertical direction and is connected to each of the fuel injection devices 60L in the left bank 28R.

As shown in FIG. 8, as seen in a plan view, the fuel supply rail 94L and the fuel supply rails 94R are located in the area 132 enclosed by the left bank 28L, the right bank 28R and the intake manifold 47. The left fuel supply rail 94L is located to the left of the center line L1, and the right fuel supply rail 94R is located to the right of the center line L1. The fuel supply rail 94L and the fuel supply rail 94R are located forward with respect to joining surfaces 95 at which the cylinder heads 30 are joined to the intake manifold 47.

Figure 18:
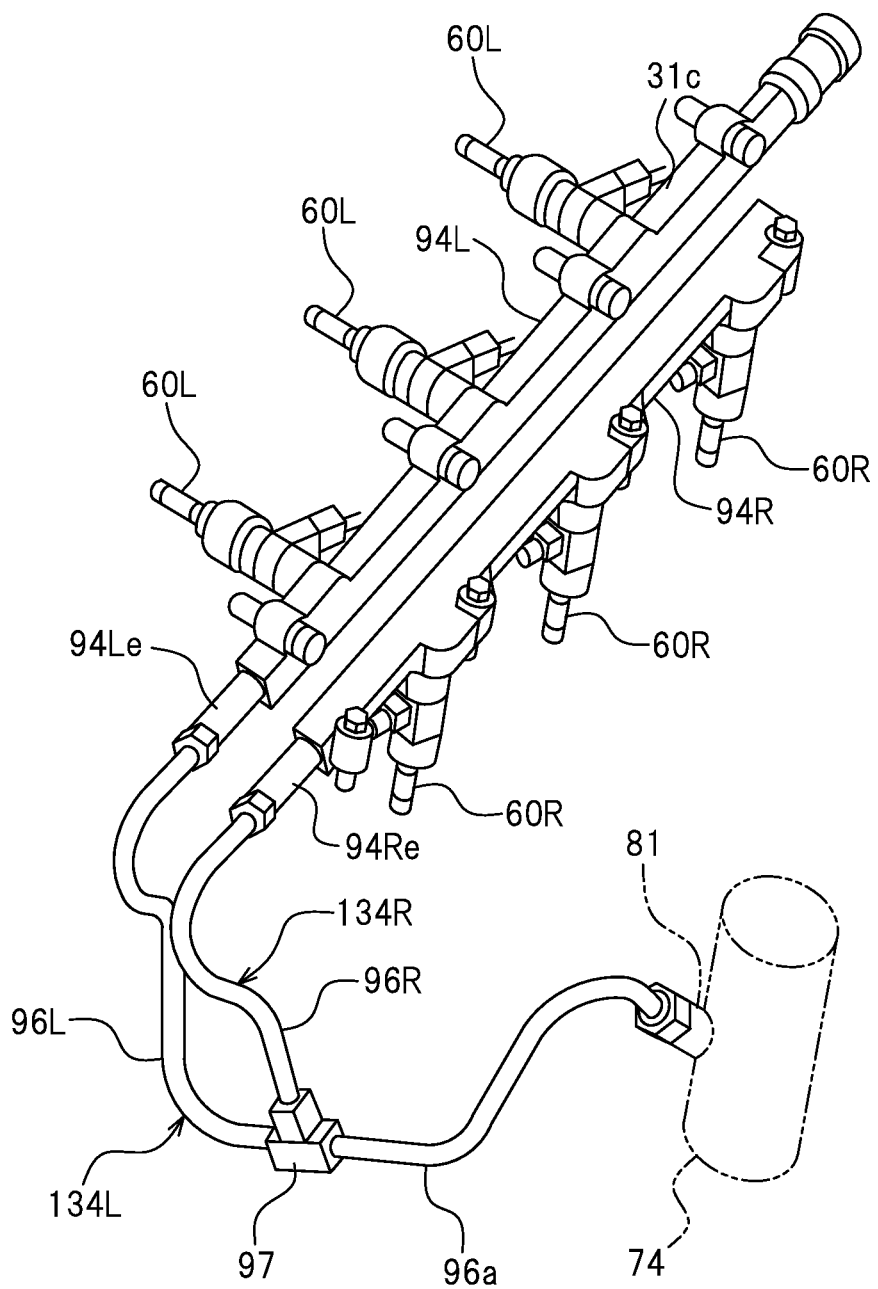

As shown in FIG. 18, the high-pressure fuel pump 74 is connected to the fuel supply rail 94L and the fuel supply rail 94R by fuel pipes 96a, 96L and 96R. One of two ends of the fuel pipe 96a is connected to the ejection section 81 of the high-pressure fuel pump 74. The other end of the fuel pipe 96a is connected to a three-way joint 97. The three-way joint 97 is connected to one of two ends of the fuel pipe 96L and one of two ends of the fuel pipe 96R. The other end of the fuel pipe 96L is connected to a bottom portion 94Le of the fuel supply rail 94L. The other end of the fuel pipe 96R is connected to a bottom portion 94Re of the fuel supply rail 94R.

The fuel supplied from the high-pressure fuel pump 74 passes through the fuel pipe 96a and is distributed into the fuel pipe 96L and the fuel pipe 96L via the three-way joint 97. The fuel in the fuel pipe 96L is supplied to the left fuel supply rail 94L. The fuel in the left fuel supply rail 94L is supplied to the fuel injection devices 60L. The fuel in the fuel pipe 96R is supplied to the right fuel supply rail 94R. The fuel in the right fuel supply rail 94R is supplied to the fuel injection devices 60R. In this manner, the fuel pipes 96a, 96L and 96R are supplied with the high-pressure fuel from the high-pressure fuel pump 74. Therefore, the fuel pipes 96a, 96L and 96R are preferably made of stainless steel or other suitable material so as to have a sufficient pressure resistance, for example. It should be noted that the material of each of the fuel pipes 96a, 96L and 96R is not limited to stainless steel and may be any other material having a pressure resistance.

In this manner, in the present preferred embodiment, the fuel from the high-pressure fuel pump 74 is distributed by the three-way joint 97 and then supplied to the fuel supply rails 94L and 94R. It should be noted that the structure of the fuel pipes arranged to supply fuel from the high-pressure fuel pump 74 to the fuel supply rails 94L and 94R is not limited to the above-described structure. According to another structure, for example, only one of the fuel supply rails 94L and 94R may be connected to the ejection section 81 of the high-pressure fuel pump 74 via the fuel pipes, and the fuel supply rail 94L and the fuel supply rail 94R may be connected to each other via another fuel pipe. In this case, the fuel ejected from the high-pressure fuel pump 74 is supplied via one of the fuel supply rail 94L and the fuel supply rail 94R to the other of the fuel supply rail 94L and the fuel supply rail 94R.

The fuel supplied to the fuel injection devices 60L and 60R is injected into the combustion chambers 36 by the fuel injection devices 60L and 60R. The injected fuel is mixed with the air in the combustion chambers 36 to become mixed gas. This mixed gas is ignited by the ignition plugs 61 and explodes. This explosion generates a driving force of the engine 8.

A portion of the non-combusted mixed gas (hereinafter, referred to as "blow-by gas") may pass a gap between the pistons 33 and the cylinders 32 and leak into the crankcase 27. The blow-by gas in the crankcase 27 is mixed with the lubricant in the crankcase 27 and flows outside the crankcase 27. The engine 8 according to the present preferred embodiment separates the blow-by gas from the lubricant and returns the blow-by gas to the combustion chambers 36. The engine 8 includes a gas/liquid separator 135 arranged to separate the blow-by gas from the lubricant. Now, a structure of the gas/liquid separator 135 will be described.

Figure 19:
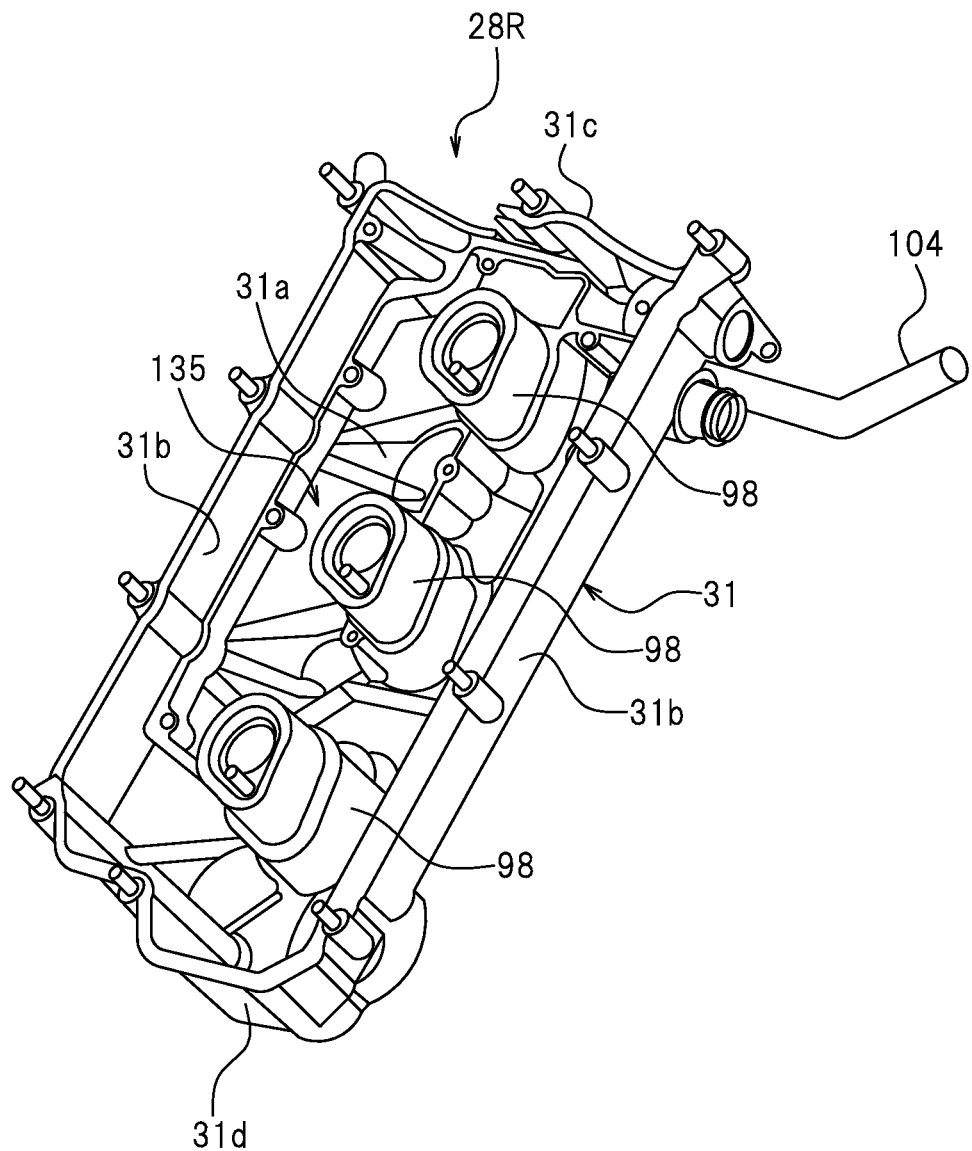
FIG. 19 is a rear surface view of a head cover in the right bank.

The gas/liquid separator 135 is provided inside the head cover 31 in the right bank 28R. FIG. 19 shows a rear surface of the head cover 31 in the right bank 28R. The rear surface of the head cover 31 is directed toward the front end of the outboard motor 1. The head cover 31 includes a rear wall 31a, side walls 31b extending rearward from side portions of the rear wall 31a, a top wall 31c extending rearward from a top portion of the rear wall 31a, and a bottom wall 31d extending rearward from a bottom portion of the rear wall 31a. The head cover 31 is provided with bosses 98 to which the ignition plugs 61 are attachable. The bosses 98 extend rearward in the head cover 31.

Figure 20:
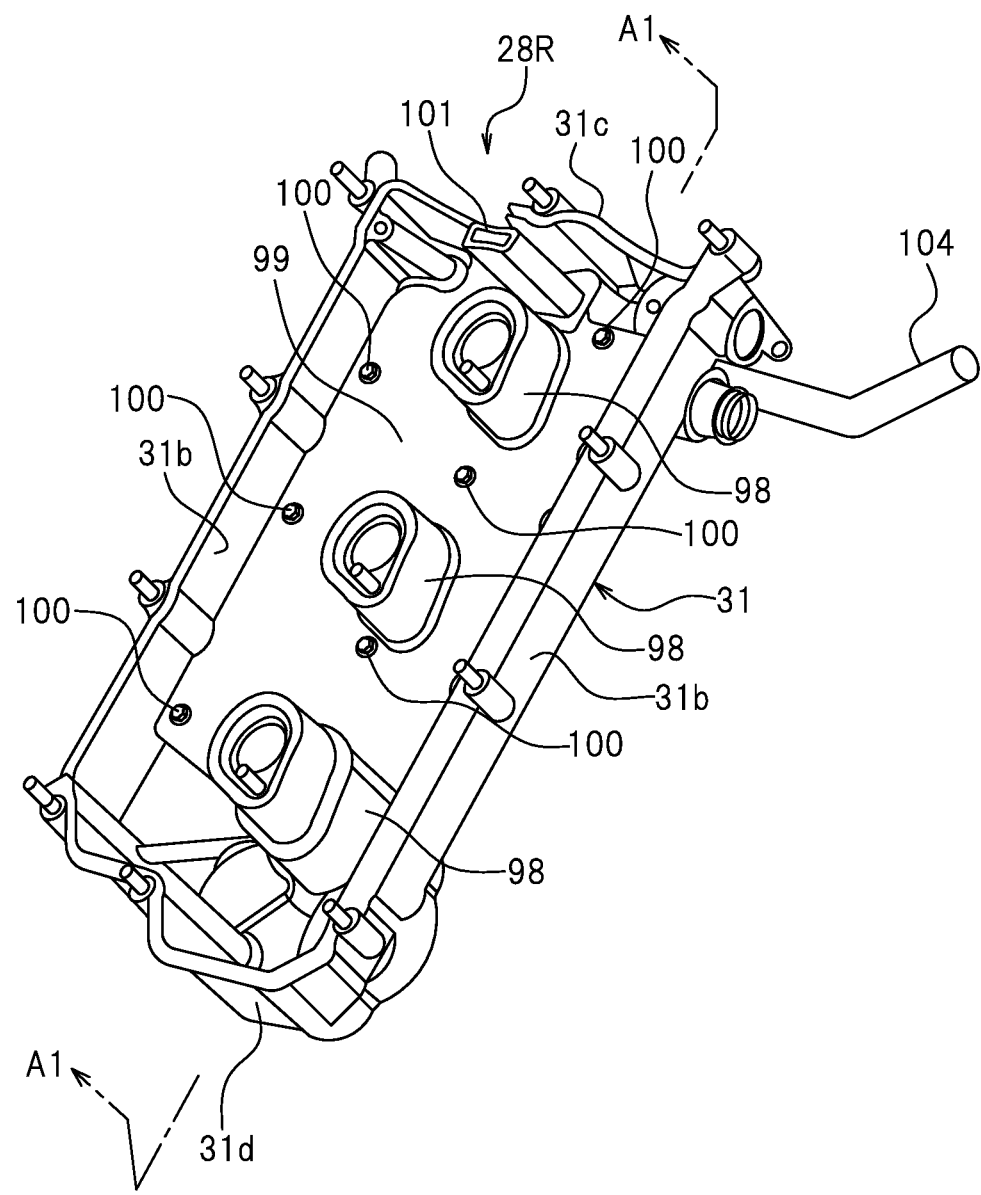
FIG. 20 is a rear surface view of a plate and a head cover in the right bank.
Figure 21:
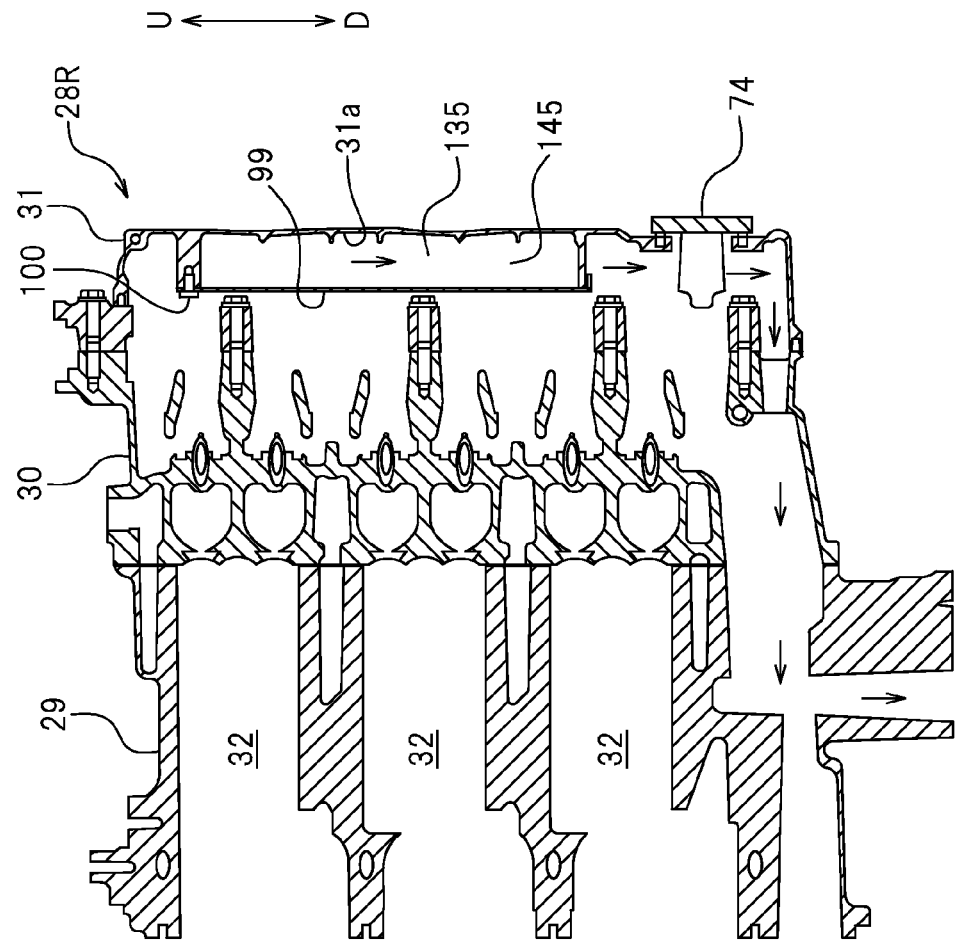
FIG. 21 is a cross-sectional view of the right bank taken along line A1-A1 in FIG. 20.

As shown in FIG. 20, inside the head cover 31, a plate 99 is arranged so as to face the rear wall 31a of the head cover 31. The plate 99 is secured to the head cover 31 preferably by a plurality of bolts 100, for example. However, there is no specific limitation on the method and structure for securing the plate 99 and the head cover 31 to each other. For example, in the case where the plate 99 and the head cover 31 are both preferably formed of a resin, the plate 99 may be secured to the head cover 31 by welding, for example. As shown in FIG. 21, the plate 99 is located so as to be distanced from the rear wall 31a of the head cover 31. Between the plate 99 and the rear wall 31a, a space 145 is provided. The plate 99 does not cover the bottom end portion of the rear wall 31a, and the space 145 is opened downward. The space 145 defines a gas/liquid separating space to separate the blow-by gas and the lubricant from each other. In this manner, the gas/liquid separator 135 is defined by the head cover 31 and the plate 99.

As shown in FIG. 20, at a top end portion of the plate 99, an flow-in section 101 is provided to introduce the blow-by gas mixed with the lubricant (hereinafter, referred to simply as the "blow-by gas"). The flow-in section 101 is structured so as to introduce the blow-by gas in the right bank 28R. In the present preferred embodiment, the flow-in section 101 includes a flat duct extending rearward in the head cover 31. In the present preferred embodiment, the duct is positioned and shaped such that the lubricant from the cams 45, 46 and the like is unlikely to flow into the duct. It should be noted that the shape of the flow-in section 101 is not limited to the above-described shape.

Figure 22:
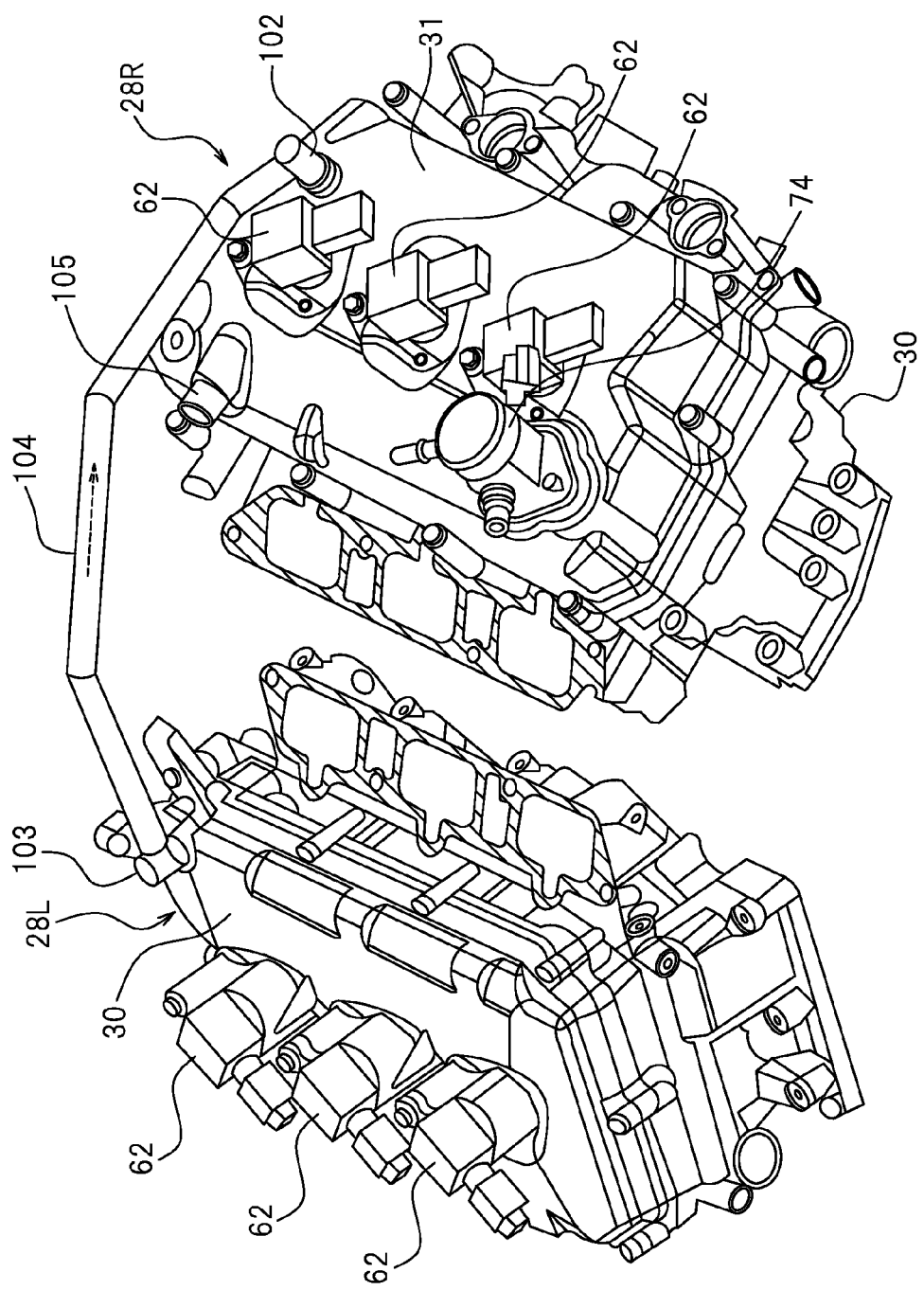
FIG. 22 is a perspective view of the head covers and the like in the left bank and in the right bank.

As shown in FIG. 22, on a front surface of the head cover 31 in the right bank 28R, another flow-in section 102 communicated to the gas/liquid separator 135 is provided. The cylinder head 30 in the left bank 28L is provided with a flow-out section 103 arranged to discharge the blow-by gas in the left bank 28L. The flow-out section 103 and the flow-in section 102 are connected to each other by a gas pipe 104. The blow-by gas in the left bank 28L is introduced into the gas/liquid separator 135 via the flow-out section 103, the gas pipe 104 and the flow-in section 102.

As shown in FIG. 22, on the front surface of the head cover 31 in the right bank 28R, a flow-out section 105 arranged to discharge gas is provided. The flow-out section 105 is communicated to a top portion of the gas/liquid separator 135. As shown in FIG. 5, the flow-out section 105 is connected to the throttle body 50 via a gas pipe 106.

The liquid lubricant and gas have significantly different specific gravities. Therefore, when flowing into the gas/liquid separator 135, the blow-by gas mixed with the lubricant is separated into the gas having a small specific gravity and the lubricant having a large specific gravity. As shown in FIG. 21, the lubricant drops downward or flows downward on a surface of the plate 99 or the like and is collected in a bottom portion of the gas/liquid separator 135. The collected lubricant is returned to an oil reservoir (not shown) in the engine 8. The gas separated from the lubricant is sent to the throttle body 50 via the flow-out section 105 and the gas pipe 106. The gas is supplied to the combustion chambers 36, together with the air sucked from the throttle body 50, via the surge tank 48, the intake manifold 47 and the intake ports 37.

As described above, the engine 8 preferably is a water-cooled engine. The engine 8 is cooled by use of water from the sea, river, lake or the like (hereinafter, referred to as "external water") on which the watercraft 2 is traveling. Now, the cooing system for cooling the engine 8 will be described.

As shown in FIG. 1, inside the upper case 17 of the outboard motor 1, a water pump 107 arranged to transport water is provided. The water pump 107 is structured so as to be driven by the drive shaft 9. The lower case 18 includes a water intake opening 107a arranged to take in the external water as the cooling water. The cooling water taken in through the water intake opening 107a is transported to the engine 8 by the water pump 107.

Figure 23:
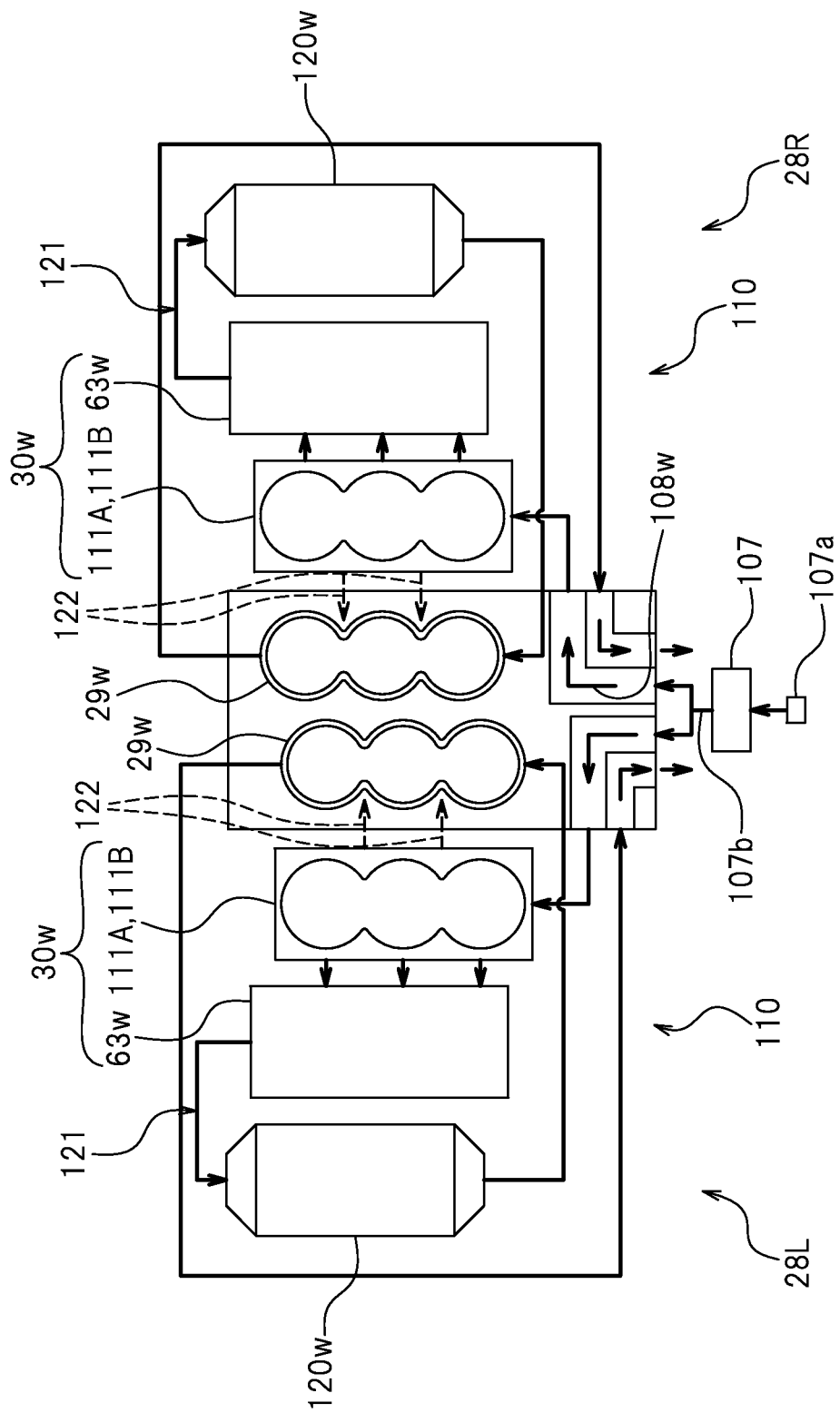
FIG. 23 is a block diagram showing a structure of a cooling system.

FIG. 23 is a block diagram showing a structure of the cooling system. The cooling system includes a cooling water path 110 in the left bank 28L and a cooling water path 110 in the right bank 28R. The cooling water path 110 in the left bank 28L and the cooling water path 110 in the right bank 28R preferably have substantially the same structure as each other. In the following, only one of the cooling water paths 110 will be described. The cooling water path 110 includes a water path 121 as a main path and a bypass path 122.

The water path 121 includes a water jacket 108w arranged around the exhaust gas path in the attachment block 115 of the engine 8, a water jacket 30w located inside the cylinder head 30, a water jacket 29w located inside the cylinder block 29, and a water jacket 120w located inside the exhaust pipe 120 (see FIG. 12). As described later in detail, the water jacket 30w of the cylinder head 30 includes a first jacket 111A and a second jacket 111B arranged around the combustion chambers 36 and a third jacket 63w arranged around the exhaust ports 38 and inside the exhaust manifold 63. The water jacket 120w of the exhaust pipe 120 is defined by the water jacket 66w of the top exhaust pipe 66 (see FIG. 12), the water jacket 65w of the catalyst case 65, and the water jacket 67w of the bottom exhaust pipe 67 which are described above.

The cooling water supplied from the water pump 107 passes through the water jacket 108w of the attachment block 115 of the engine 8 and flows into the first jacket 111A and the second jacket 111B of the cylinder head 30. The cooling water in the first jacket 111A and the second jacket 111B cools the cylinder head 30. A portion of the cooling water in the first jacket 111A and the second jacket 111B flows into the third jacket 63w. Another portion of the cooling water in the first jacket 111A and the second jacket 111B flows into the water jacket 29w of the cylinder block 29 via the bypass path 122. The cooling water in the third jacket 63w cools a portion of the cylinder 30 and also the exhaust manifold 63, and then flows into the water jacket 120w. The cooling water in the water jacket 120w cools the exhaust pipe 120. In other words, the cooling water in the water jacket 120w cools the exhaust gas and the catalyst 64 in the exhaust pipe 120. The cooling water which has cooled the exhaust gas and the catalyst 64 flows from the water jacket 120w into the water jacket 29w of the cylinder block 29. The cooling water in the water jacket 29w cools the cylinder block 29. The cooling water which has cooled the cylinder block 29 passes through a water discharge path (not shown) and is discharged outside the outboard motor 1.

Figure 24:
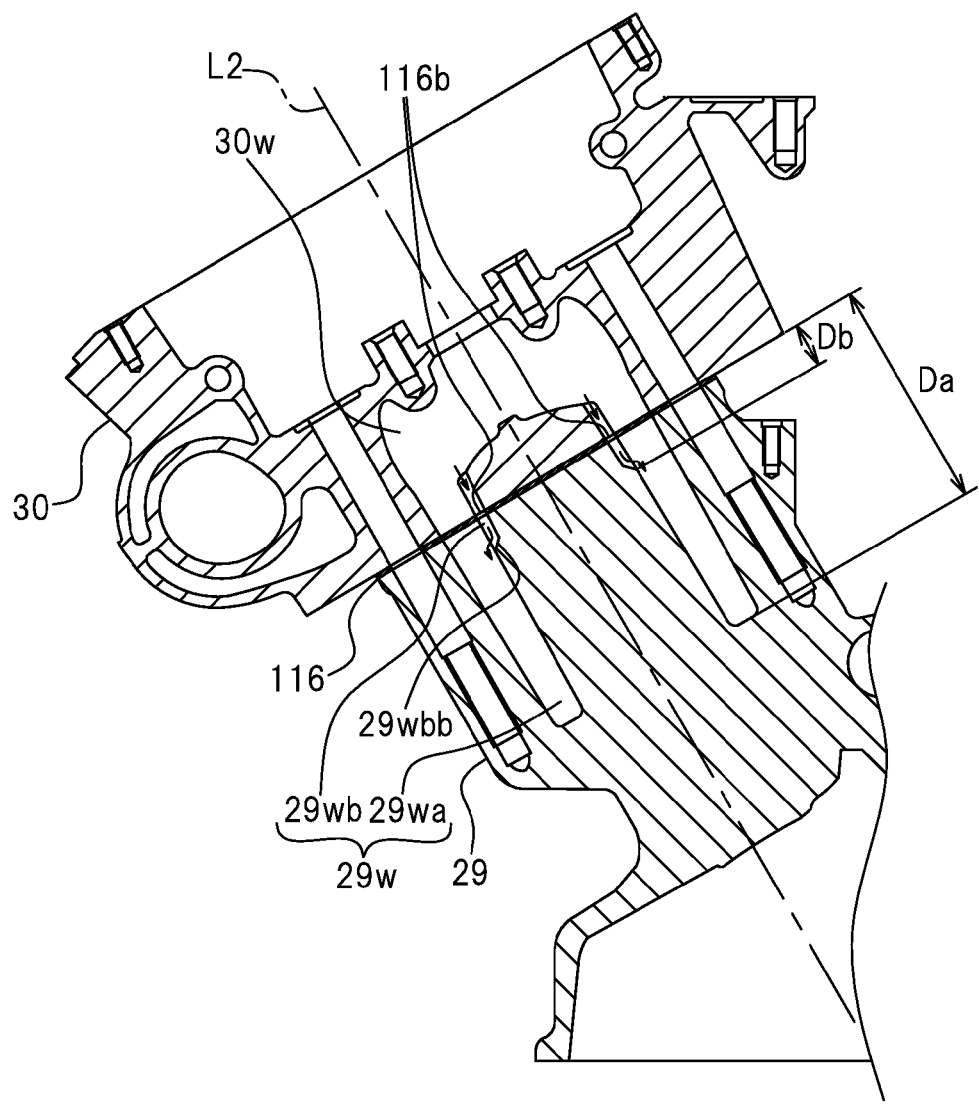
FIG. 24 is a cross-sectional view of a water jacket of a cylinder block and a water jacket of a cylinder head.
Figure 25:
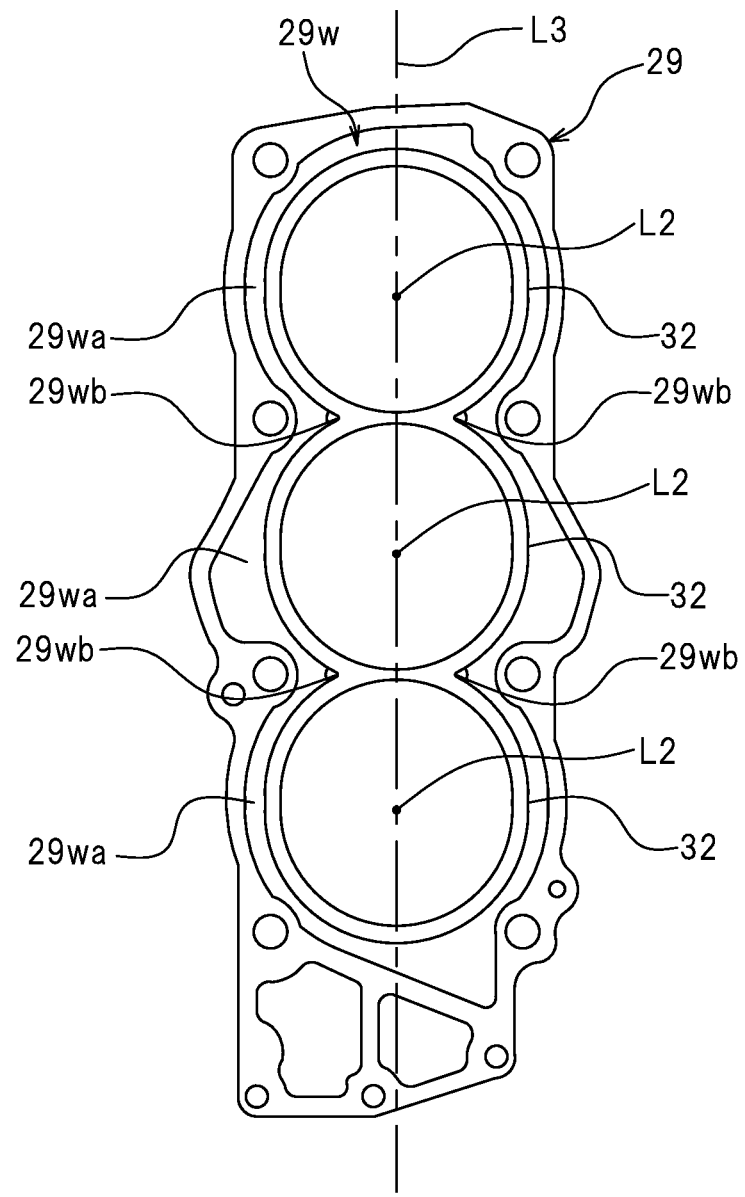
FIG. 25 is a front surface view of the cylinder block.
Figure 26:
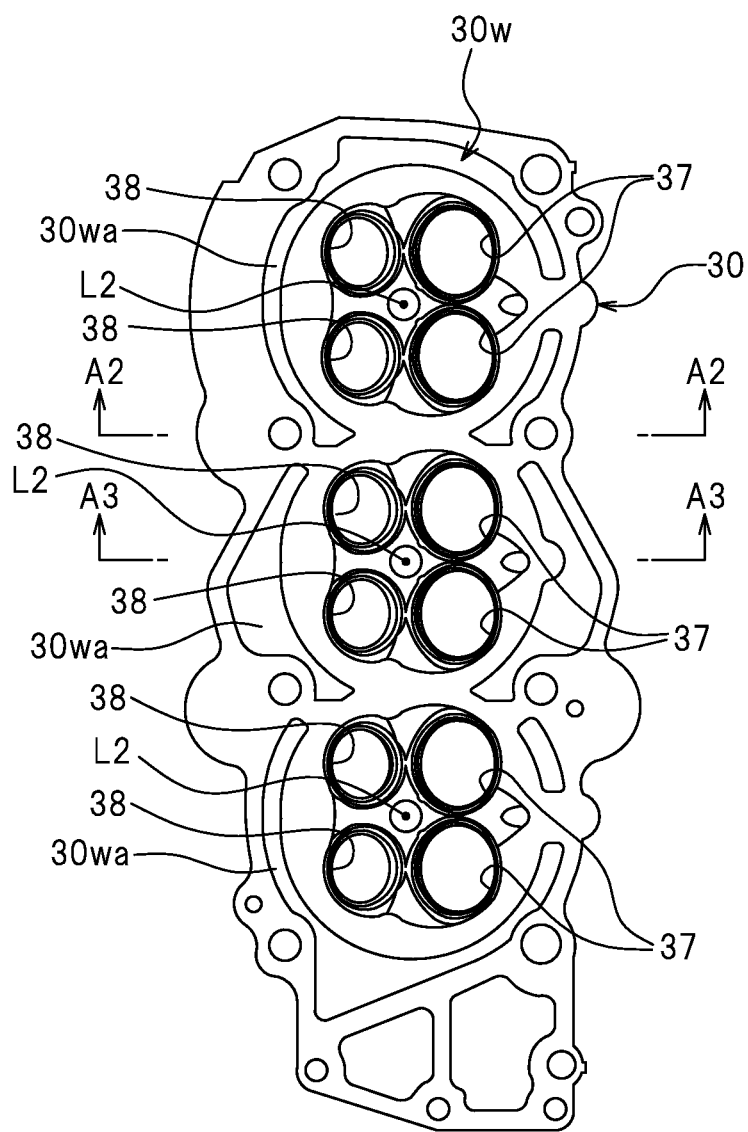
FIG. 26 is a rear surface view of the cylinder head.
Figure 27:
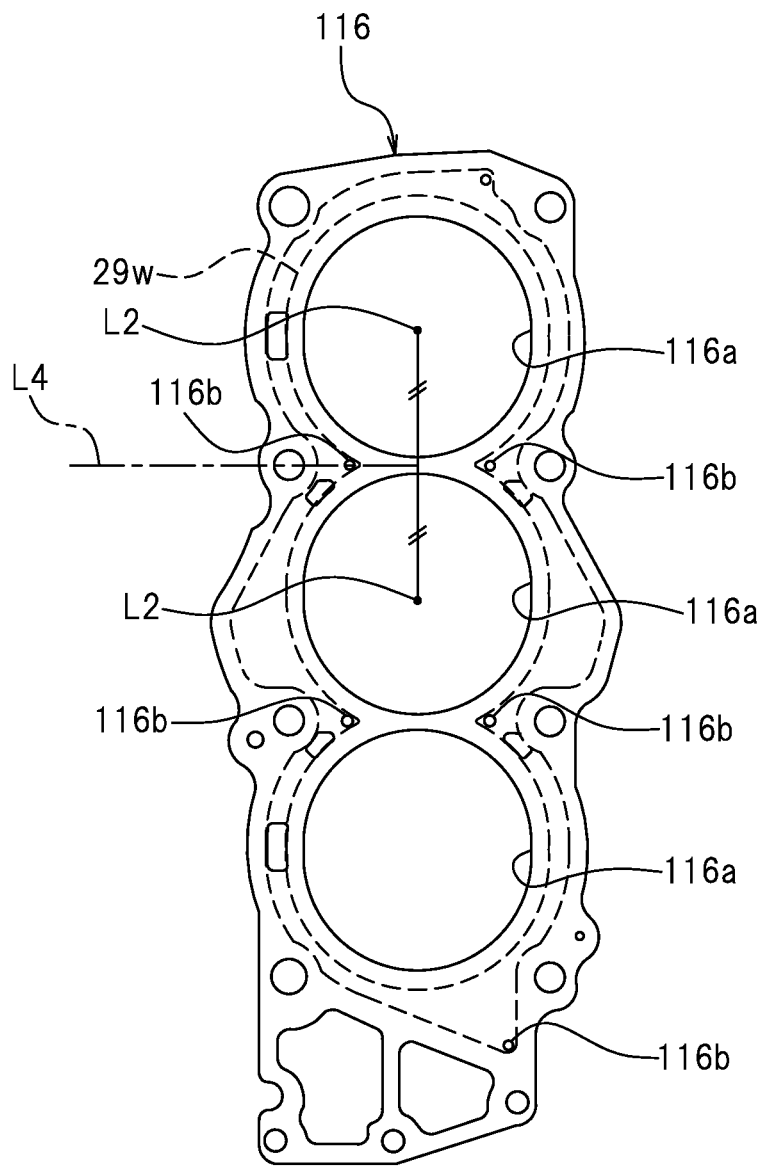
FIG. 27 is a front surface view of a gasket.

FIG. 24 is a cross-sectional view of the cylinder block 29 and the cylinder head 30. Between the cylinder block 29 and the cylinder head 30, a gasket 116 is held. FIG. 25 is a front surface view of the cylinder block 29 as seen in the direction of the cylinder axis line L2. FIG. 26 is a rear surface view of the cylinder head 30 as seen in the direction of the cylinder axis line L2. FIG. 27 is a front surface view of the gasket 116 as seen in the direction of the cylinder axis line L2. The front surface of the cylinder block 29 is directed toward the rear end of the outboard motor 1. The rear surface of the cylinder head 30 is directed toward the front end of the outboard motor 1. The front surface of the gasket 116 is directed toward the rear end of the outboard motor 1.

As shown in FIG. 25, the water jacket 29w of the cylinder block 29 includes generally annular grooves 29wa to enclose the uppermost, middle and lowermost cylinders 32, respectively. Each groove 29wa is arranged around the corresponding cylinder 32 and extends in an axial direction thereof. Two adjacent cylinders 32 among the cylinders 32 are linked to each other, and two adjacent grooves 29wa are continuous with each other. At side portions of a linking portion of the cylinders 32, cut-out grooves 29wb are provided. Each cut-out groove 29wb is recessed toward a line L3 which connects centers of the cylinders 32. As shown in FIG. 24, depth Db of the cut-out groove 29wb is smaller than depth Da of the groove 29wa. A bottom surface 29wbb of the cut-out groove 29wb is inclined.

As shown in FIG. 26, the water jacket 30w of the cylinder head 30 includes jacket portions 30wa arranged to partially enclose the uppermost, middle and lowermost combustion chambers, respectively. The jacket portions 30wa are communicated to each other inside the cylinder head 30. The jacket portions 30wa define the first jacket 111A or the second jacket 111B described above.

As shown in FIG. 27, the gasket 116 includes openings 116a corresponding to the cylinders 32, respectively. The gasket 116 includes holes 116b that guide the cooling water from the water jacket 30w of the cylinder head 30 to the water jacket 29w of the cylinder block 29. The holes 116b are arranged such that when the gasket 116 is held between the cylinder block 29 and the cylinder head 30, a portion of the holes 116b is located above the cut-out groove(s) 20wb of the cylinder block 29. In this example, all the holes 116b are preferably located above the cut-out grooves 20wb, for example. As shown in FIG. 24, a portion of the cooling water in the water jacket 30w of the cylinder head 30 flows into the cut-out grooves 29wb of the cylinder block 29 via the holes 116b and flows into the grooves 29wa. The bypass path 122 (see FIG. 23) for the cooling water is formed by the holes 116b of the gasket 116.

Figure 28:
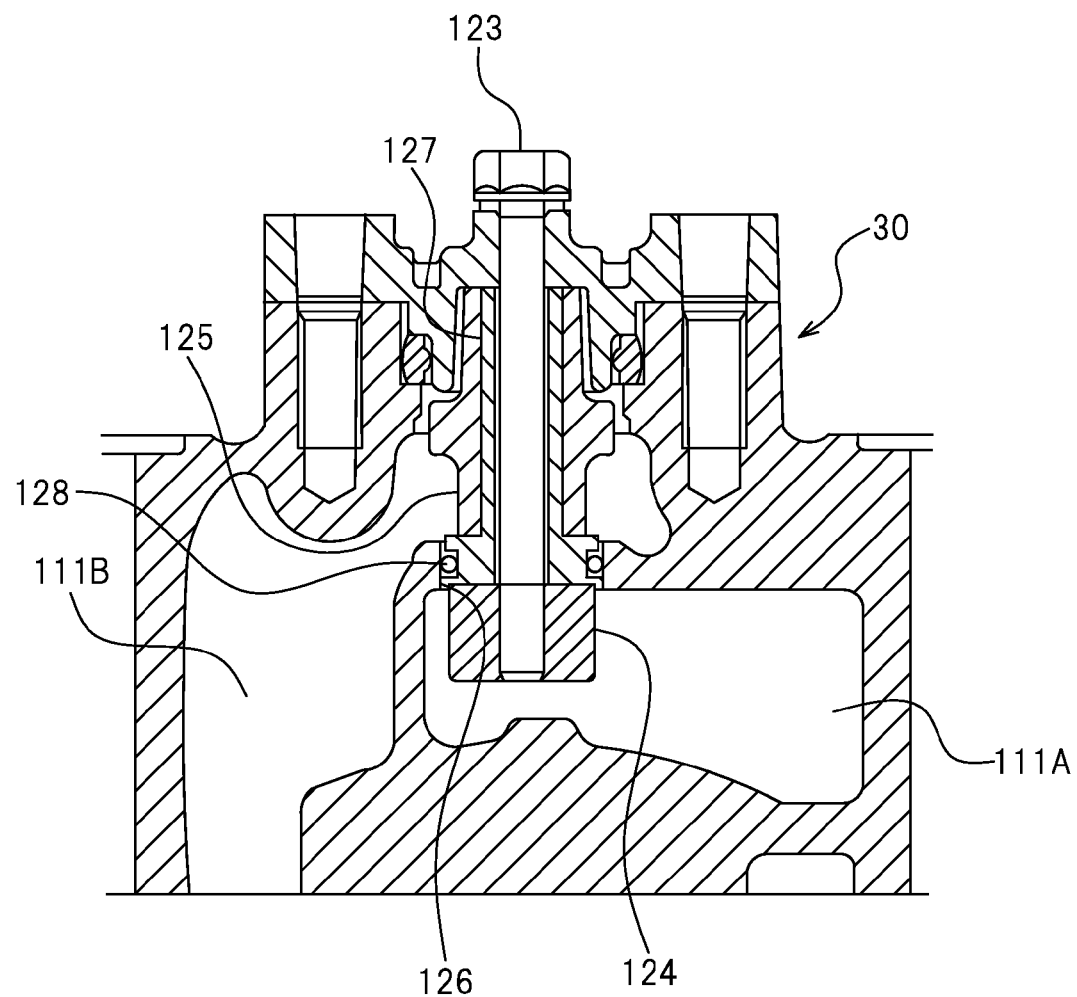
FIG. 28 is a cross-sectional view of the cylinder head taken along line A2-A2 in FIG. 26.
Figure 29:
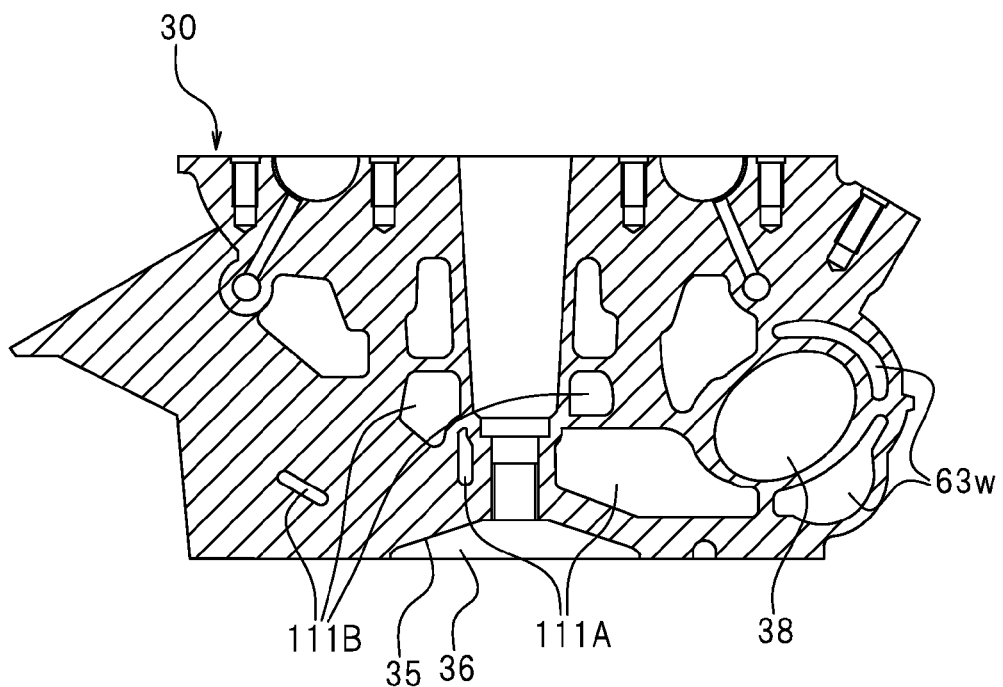
FIG. 29 is a cross-sectional view of the cylinder head taken along line A3-A3 in FIG. 26.

There is no specific limitation on the structure of the water jacket 30w of the cylinder head 30. As described above, in the present preferred embodiment, the water jacket 30w includes the first jacket 111A, the second jacket 111B, and the third jacket 63w. FIG. 28 is a cross-sectional view taken along line A2-A2 in FIG. 26. Specifically, FIG. 28 is a cross-sectional view of a portion between two adjacent cylinders 32. FIG. 29 is a cross-sectional view taken along line A3-A3 in FIG. 26. Specifically, FIG. 29 is a view of a cross-section including the cylinder axis line L2.

As shown in FIG. 29, in a cross-section including the cylinder axis line L2, the first jacket 111A is generally located below the second jacket 111B. The first jacket 111A and the first jacket 111B are generally arranged around the combustion chamber 36. The first jacket 111A and the first jacket 111B may be referred to as an "upper jacket" and a "lower jacket", respectively. Herein, the terms "upper" and "lower" simply refer to upper and lower in FIG. 29. A portion of the third jacket 63w is formed around the exhaust port 38.

The first jacket 111A is located relatively close to the combustion chamber 36, and the second jacket 111B is located farther from the combustion chamber 36 than the first jacket 111A is. The first jacket 111A is generally located closer to the exhaust port 38 than the second jacket 111B is. In other words, the first jacket 111A is generally located outward relative to the second jacket 111B in the outboard motor width direction. The third jacket 63w is located outward relative to the first jacket 111A and the second jacket 111B in the outboard motor width direction. In general, the second jacket 111B, the first jacket 111A and the third jacket 63w are arranged in this order from the inner side to the outer side in the outboard motor width direction. As is clear from a comparison of FIG. 28 and FIG. 29, the horizontal cross-sectional shape of each of the first jacket 111A and the second jacket 111B changes in the vertical direction. Although not shown, the horizontal cross-sectional shape of the third jacket 63w also changes in the vertical direction.

As described above, a portion of the third jacket 63w is located between the inner pipe 63i of the exhaust manifold 63 and an outer wall 63o integral with the cylinder head (see FIG. 12). Although not shown, in a side surface of the outer wall 63o integral with the cylinder head, a flow-in opening for the cooling water which is communicated to the second jacket 111B is provided. The cooling water is introduced into an area between the inner pipe 63i and the outer wall 63o of the exhaust manifold 63 via the flow-in opening.

As described above, the water jacket 120w of the exhaust pipe 120 includes the water jacket 66w of the top exhaust pipe 66, the water jacket 65w of the catalyst case 65, and the water jacket 67w of the bottom exhaust pipe 67 (see FIG. 12). The water jacket 120w of the exhaust pipe 120 is arranged so as to cause the cooling water to flow generally downward. The water jacket 65w of the catalyst case 65 is arranged so as to cause the cooling water to flow downward.

As shown in FIG. 12, the outer pipe 66o of the top exhaust pipe 66 includes an air extraction hole 66a arranged to extract air. The hole 66a is communicated to the water jacket 66w of the top exhaust pipe 66. The hole 66a is provided at a position which is located at the uppermost position of the top exhaust pipe 66 when the outboard motor 1 is kept in a horizontal posture. The hole 66*a* is located in a curved portion of the top exhaust pipe 66. Around the hole 66*a*, a nipple 117 protruding upward is provided. Although not shown, the nipple 117 is connected to a hose. Through the hole 66*a*, the air stuck in the water jacket 120*w* can be discharged. The hole 66*a* is always open.

As shown in FIG. 12, the outer pipe 67*o* of the bottom exhaust pipe 67 includes a water extraction hole 67*a* arranged to extract water. The hole 67*a* communicates with the water jacket 67*w* of the bottom exhaust pipe 67. When not used, the outboard motor 1 is largely tilted up. The hole 67*a* is provided at a position, or in the vicinity thereof, which is located at the lowermost position of the bottom exhaust pipe 67 when the outboard motor 1 is tilted up. For example, the hole 67*a* may be arranged such that, in the case where the outboard motor 1 is set to tilted up by angle α from horizontal line P when not being in use, when the outboard motor 1 is kept in a horizontal posture, the angle made by the tangential line of the portion where the hole 67*a* is located and the horizontal line is α as seen in a side view. In the present preferred embodiment, the catalyst case 65 is arranged so as to extend in the vertical direction when the outboard motor 1 is kept in a horizontal posture. The hole 67*a* may be formed such that when the outboard motor 1 is kept in a horizontal posture, the angle made by the tangential line of the portion where the hole 67*a* is formed and the axial line of the catalyst case 65 is 90°-α as seen in a side view.

As shown in FIG. 12, the cylinder block 29 includes a hole 118 through which the cooling water can be discharged. The hole 67*a* and the hole 118 are communicated to each other by a rubber hose 119, for example. Instead of the rubber hose 119, a hose formed of another material such as a resin or the like may preferably be used. Instead of the hose 119, a pipe formed of, for example, a metal material such as stainless steel or the like may preferably be used. It should be noted that the rubber hose 119 is flexible. Since the hose 119 having flexibility is expandable, even if the cooling water in the hose 119 is frozen, the hose 119 has no undesirable possibility of being broken. The cooling water in the water jacket 67*w* and the like can be discharged outside via the hole 67*a*, the hose 119 and the hole 118.

Figure 30:
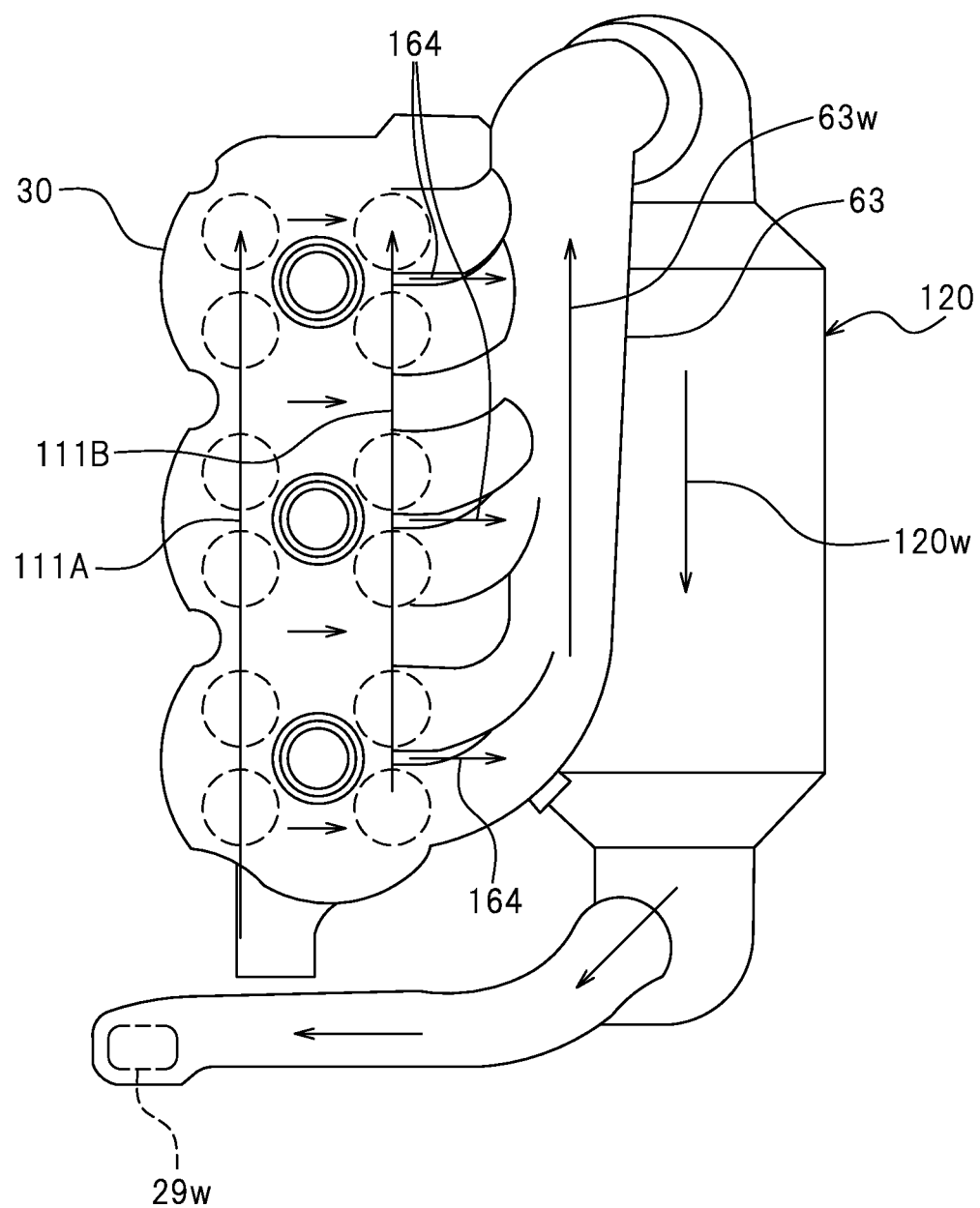
FIG. 30 is a view showing the flow of cooling water in water jackets according to a preferred embodiment of the present invention.

As described above, the cooling water which has flown into the first jacket 111A and the second jacket 111B of the cylinder head 30 partially flows into the water jacket 29*w* of the cylinder block 29 via the bypass path 122. As shown in FIG. 30, the rest of the cooling water flows upward in the first jacket 111A and the second jacket 111B while a portion thereof sequentially flows out to the third jacket 63*w* (see reference sign 164). In the third jacket 63*w*, the cooling water flows upward while being joined sequentially with the cooling water flowing in from the first jacket 111A and the second jacket 111B. The cooling water flows from the third jacket 63*w* into the water jacket 120*w* of the exhaust pipe 120, passes downward in the water jacket 120*w*, and then flows into the water jacket 29*w* of the cylinder block 29.

As shown in FIG. 28, the cylinder head 30 includes a hole 126 extending from the first jacket 111A to the second jacket 111B. A collar 127 is fit into the hole 126. A bolt 123 is preferably inserted into the collar 127. Reference sign 128 represents a ring-shaped seal. The bolt 123 extends from the first jacket 111A to the second jacket 111B. A tip portion of the bolt 123, in other words, a portion of the bolt 123 which is in the first jacket 111A is provided with a first anticorrosive electrode 124 attached thereto. A portion of the bolt 123 which is in the second jacket 111B is provided with a second anticorrosive electrode 125 attached thereto via the collar 127. The first anticorrosive electrode 124 in the first jacket 111A and the second anticorrosive electrode 125 in the second jacket 111B are attached to the same bolt 123. The expression "attached to the bolt" encompasses a state of being directly attached to the bolt 123 as in the case of the first anticorrosive electrode 124 and also a state of being attached to the bolt 123 indirectly via another member as in the case of the second anticorrosive electrode 125. The first anticorrosive electrode 124 and the second anticorrosive electrode 125 prevent the cylinder head 30 from being corroded. In the case where external water is used as the cooling water, the corrosion of the cylinder head 30 may be promoted depending on the components of the external water. Especially in the case where seawater is used as the cooling water, corrosion is likely to occur. However, according to the present preferred embodiment, such corrosion can be effectively prevented by the first anticorrosive electrode 124 and the second anticorrosive electrode 125.

With the outboard motor 1 according to the present preferred embodiment, as shown in FIG. 23, the water path 121 is provided in which the water supplied from a water supply path 107*b* flows in the water jacket 30*w* of the cylinder head 30, the water jacket 120*w* of the exhaust pipe 120, and the water jacket 29*w* of the cylinder block 29 in this order. The water supplied from the water supply path 107*b* to the water path 121 is first supplied to the water jacket 30*w* of the cylinder head 30. Therefore, the cylinder head 30 can be efficiently cooled by the water having a relatively low temperature. In order to prevent generation of knocking of the engine 8, it is effective to sufficiently cool the cylinder head 30. According to the present preferred embodiment, the cylinder head 30 can be efficiently cooled and thus the knocking of the engine 8 is not likely to be generated.

The water which has cooled the cylinder head 30 is supplied to the water jacket 120*w* of the exhaust pipe 120. As compared with the case where water which has cooled both of the cylinder head 30 and the cylinder block 29 is supplied to the exhaust pipe 120, the water supplied to the water jacket 120*w* of the exhaust pipe 120 in the present preferred embodiment has a lower temperature. Therefore, the exhaust pipe 120 can be cooled effectively.

The water which has cooled the exhaust pipe 120 is supplied to the water jacket 29*w* of the cylinder block 29. The water jacket 29*w* of the cylinder block 29 is supplied with the water having a raised temperature as a result of cooling the cylinder head 30 and the exhaust pipe 120. Therefore, the cylinder block 29 is not excessively cooled and thus warm-up can be performed in a satisfactory manner. In addition, an increase in the loss of the engine output caused by a rise of viscosity of the lubricant can be reliably prevented.

In this manner, with the outboard motor 1 according to the present preferred embodiment, the engine 8 can be cooled efficiently and with good balance.

With the outboard motor 1, as shown in FIG. 12, the catalyst 64 is accommodated in the exhaust pipe 120. Therefore, the exhaust gas discharged from the engine 8 can be purified by the catalyst 64. If the temperature of the exhaust pipe 120 is too high, the catalyst 64 may be deteriorated. However, with the outboard motor 1 according to the present preferred embodiment, the exhaust pipe 120 can be effectively cooled. Therefore, the deterioration of the catalyst 64 can be reliably prevented.

When the driving of the engine 8 is stopped and the flow of the water in the water path 121 is stopped, the temperature in the cowling 16 of the outboard motor 1 is temporarily raised. In the catalyst 64, heat is stored. Therefore, even after the driving is stopped, the heat is released from the catalyst 64. Such heat release from the catalyst 64 may make it difficult to lower the temperature of the other components in the cowling 16 (e.g., electric components such as the ECU 22 and the like). However, a portion of the water jacket 120w downstream with respect to the catalyst 64 is connected to the cylinder block 29. Although not shown, an outlet of the cooling water in the cylinder block 29 is provided at a relatively high position. Therefore, water is likely to remain in the water jacket 120w of the exhaust pipe 120 after the driving is stopped. Thus, even after the driving is stopped, the catalyst 64 can be kept cooled by the remaining water and thus the heat release from the catalyst 64 can be reliably prevented. The temperature of the other components in the cowling 16 can be lowered relatively rapidly.

With the outboard motor 1, as shown in FIG. 23, the bypass path 122 is arranged to cause the water from the water jacket 30w of the cylinder head 30 to flow to the water jacket 29w of the cylinder block 29 in a bypassing manner. When the temperature of the cylinder head 30 and the exhaust pipe 120 is high, for example, after the warm-up is finished, the temperature of the water supplied to the water jacket 29w of the cylinder block 29 via the water path 121 may become high. However, with the outboard motor 1, the water in the water jacket 30w of the cylinder head 30, in other words, the water which has not cooled the exhaust pipe 120 and thus has a lower temperature, is supplied to the water jacket 29w of the cylinder block 29 via the bypass path 122. Therefore, the rise of the temperature of the cylinder block 29 can be prevented. The outboard motor 1 according to the present preferred embodiment can cool the engine efficiently and with good balance also for this reason.

With the outboard motor 1, the bypass path 122 includes the holes 116b (see FIG. 27) of the gasket 116. The flow path cross-sectional area size of the each hole 116b is preferably smaller than any other flow path cross-sectional area size of the water path 121. The minimum flow path cross-sectional area size of the bypass path 122 is smaller than the minimum flow path cross-sectional area size of the water path 121. As a result, the flow rate of the bypass path 122 is lower than the flow rate of the water path 122. In this manner, the engine 8 can be cooled with good balance by a simple structure of appropriately setting the minimum flow path cross-sectional area size.

Especially according to the present preferred embodiment, the bypass path 122 includes the holes 116b of the gasket 116. Therefore, the bypass path 122 can be formed in a satisfactory manner by a simple work of forming the holes 116b of an appropriate size in the gasket 116, which can be easily processed.

In the cylinder block 29, the temperature of a portion between each two adjacent cylinders 32 is likely to be high. There is no specific limitation on the position of the holes 116b defining the bypass path 122. In the present preferred embodiment, as shown in FIG. 27, the holes 116b are located on a vertical bisector line L4 of a line connecting centers L2 of adjacent cylinders 32, as seen in the axial direction of the cylinders 32. The water in the water jacket 30w of the cylinder head 30 is supplied to the portion between each two adjacent cylinders 32 in the cylinder block 29. Therefore, the portions of the cylinder block 29 which are likely to have a high temperature can be cooled with priority. Thus, the cylinder block 29 can be efficiently cooled.

As shown in FIG. 25, the water jacket 29w of the cylinder block 29 includes cut-out grooves 29wb. As seen in the axial direction of the cylinders 32, the cut-out grooves 29wb are recessed toward the line L3 connecting the centers (axial lines L2) of adjacent cylinders 32. As shown in FIG. 24, depth Db of the cut-out groove 29wb is smaller than depth Da of the groove 29wa. The holes 116b defining the bypass path 122 are located above the cut-out grooves 29wb. Therefore, the portion between each two adjacent cylinders 32 which is likely to have a high temperature can be cooled more effectively.

As shown in FIG. 29, the cylinder head 30 includes the first jacket 111A and the second jacket 111B arranged around the combustion chamber 36 as combustion chamber water jackets. The cylinder head 30 includes the third jacket 63w arranged around the exhaust port 38 as an exhaust port water jacket. The cylinder head 30 is structured so as to introduce water into the combustion chamber water jackets 111A and 111B and to discharge the water from the third jacket 63w. A portion of the cylinder head 30 around the combustion chamber 36 is likely to have a temperature higher than that of the portion around the exhaust port 38. According to the present preferred embodiment, the portion of the cylinder head 30 which has a higher temperature can be cooled with priority. Thus, the cylinder head 30 can be efficiently cooled.

As shown in FIG. 30, the first jacket 111A and the second jacket 111B, which are combustion chamber water jackets, and the third jacket 63w, which is an exhaust port water jacket, are communicated to each other in the portion 164 around each cylinder 32. The first jacket 111A, the second jacket 111B and the third jacket 63w are arranged so as to cause the water to flow upward. The water jacket 120w of the exhaust pipe 120 is arranged so as to cause the water to flow downward. As a result of such a structure, the engine 8 can be cooled with good balance.

As shown in FIG. 29, in a vertical cross-section including the cylinder axis line L2, among the first jacket 111A and the second jacket 111B around the combustion chamber 36, the first jacket 111A is located closer to the combustion chamber 36 than the second jacket 111B is. In other words, the second jacket 111B is located farther from to the combustion chamber 36 than the first jacket 111A is. The cylinder head 30 is arranged so as to introduce water into the first jacket 111A. In this manner, by introducing water to the first jacket 111A closer to the combustion chamber 36 with priority, a portion of the cylinder head 30 which is in the vicinity of the combustion chamber 36 can be effectively cooled.

As shown in FIG. 28, the first jacket 111A and the second jacket 111B are respectively provided with the first anticorrosive electrode 124 and the second anticorrosive electrode 125. As a result, the corrosion of the cylinder head 30 can be effectively prevented. The first anticorrosive electrode 124 and the second anticorrosive electrode 125 are preferably attached to the same bolt 123. Therefore, as compared with the case where the first anticorrosive electrode 124 and the second anticorrosive electrode 125 are attached to different members, the number and the cost of the components can be decreased.

As described above, the outboard motor main body 7 can be tilted about the tilt shaft 5 (see FIG. 1). When, for example, the outboard motor 1 is not used, the outboard motor main body 7 may be largely tilted with respect to the hull 3. For example, the outboard motor main body 7 may be tilted with respect to the hull 3 such that the tilt angle from the horizontal surface is α (see FIG. 12). In such a case, the exhaust pipe 120 may also be tilted, so that a portion of the water jacket 120w of the exhaust pipe 120 may be located below an inlet 120wi and an outlet 120wo (see FIG. 12) of the water jacket 120w. As a result, water may remain in a portion of the water jacket 120w. However, with the outboard motor 1 according to the present preferred embodiment, the water extraction hole 67a is provided in a portion which is located below the inlet 120wi and the outlet 120wo when the exhaust pipe 120 is tilted. Therefore, the amount of water stored in the water jacket 120w of the exhaust pipe 120 when the outboard motor 1 is tilted can be made small. Alternatively, the outboard motor 1 may be structured such that the water is not stored in the water jacket 120w.

With the outboard motor 1 according to the preferred embodiment described above, the first jacket 111A and the second jacket 111B around the combustion chamber 36 and the third jacket 63w around the exhausts ports 38 preferably are communicated to each other in the portion 164 around each cylinder 32. However, the first jacket 111A, the second jacket 111B and the third jacket 63w may be modified in various manners.

Figure 31:
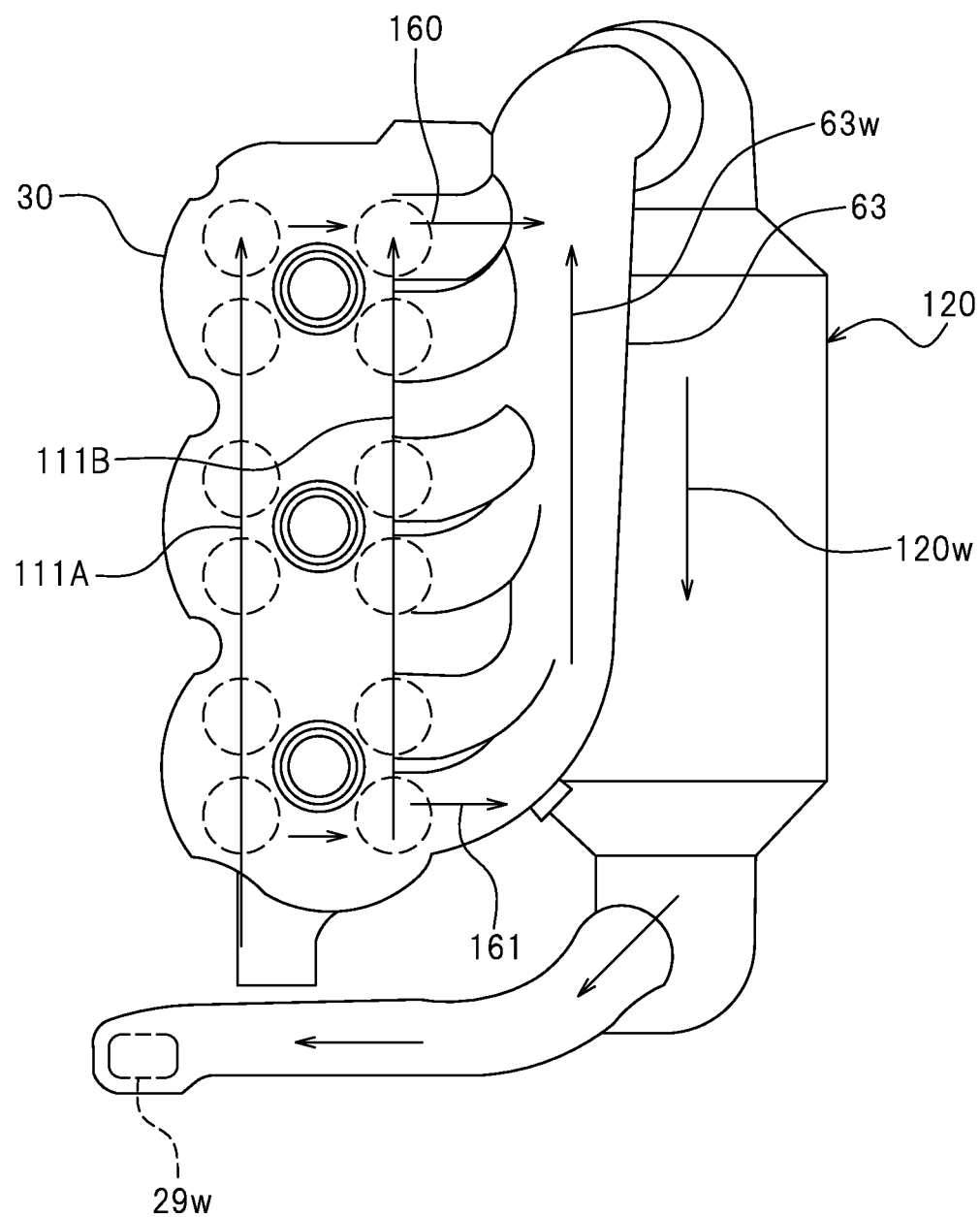
FIG. 31 is a view showing the flow of the cooling water in the water jackets according to a preferred embodiment of the present invention.

As shown in FIG. 31, with the outboard motor 1 according to another preferred embodiment of the present invention, the first jacket 111A and the second jacket 111B preferably are communicated to the third jacket 63w in a portion 160 around the uppermost cylinder 32 and a portion 161 around the lowermost cylinder 32. The first jacket 111A, the second jacket 111B and the third jacket 63w are all arranged so as to cause the water to flow upward.

The water which has flown from an entrance of the head is distributed into the first jacket 111A, the second jacket 111B and the third jacket 63w in the portion around the lowermost cylinder 32. The distributed portions of the water flow upward in the first jacket 111A, the second jacket 111B and the third jacket 63w. The water which has flown in the first jacket 111A and in the second jacket 111B is joined with the water flowing in the third jacket 63w in the portion around the uppermost cylinder 32. The post-joining water flows into the water jacket 120w of the exhaust pipe 120 from the third jacket 63w and flows downward in the water jacket 120w.

In the present preferred embodiment also, the engine 8 can be cooled with good balance.

Figure 32:
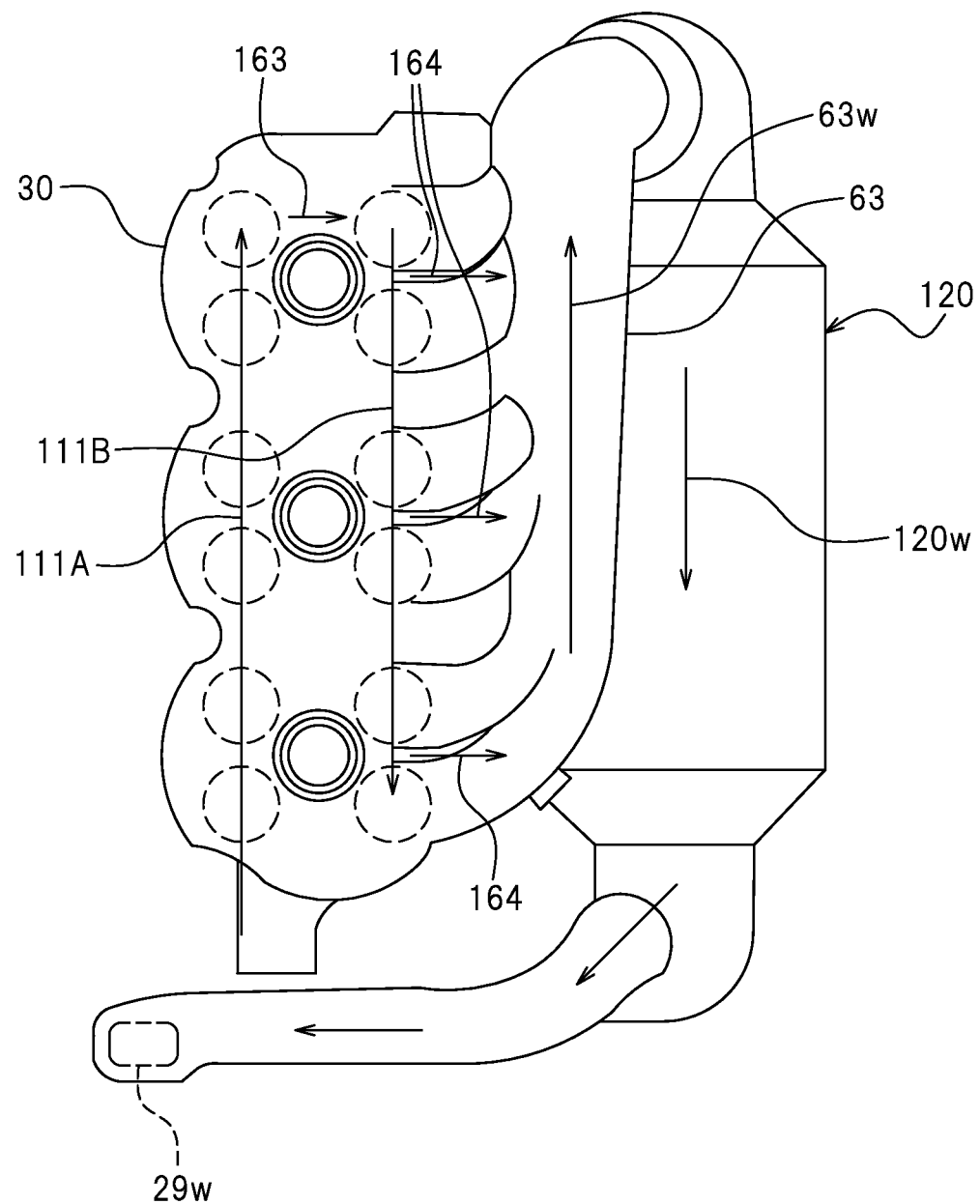
FIG. 32 is a view showing the flow of the cooling water in the water jackets according to a preferred embodiment of the present invention.

As shown in FIG. 32, with the outboard motor 1 according to a further preferred embodiment of the present invention, the first jacket 111A and the second jacket 111B preferably are communicated to each other in an area 163 around the uppermost cylinder 32. The second jacket 111B and the third jacket 63w preferably are communicated to each other in the portion 164 around each cylinder 32. The first jacket 111A is arranged so as to cause the water, introduced from the entrance of the head, to flow upward. The second jacket 111B is arranged so as to cause the water to flow downward. The third jacket 63w is arranged so as to cause the water to flow upward.

The water which has flown from the entrance of the head into the first jacket 111A flows upward in the first jacket 111A. The water which has flown in the first jacket 111A flows into the second jacket 111B in the area 163 around the uppermost cylinder 32. The water in the second jacket 111B gradually flows into the third jacket 63w while flowing downward in the second jacket 111B. The water in the third jacket 63w is joined with the water from the second jacket 111B, while flowing upward in the third jacket 63w. The post-joining water flows into the water jacket 120w of the exhaust pipe 120 from the third jacket 63w and flows downward in the water jacket 120w.

In the present preferred embodiment also, the engine 8 can be cooled with good balance. Especially according to the present preferred embodiment, the water flows in the first jacket 111A and then flows in the second jacket 111B. As described above, the first jacket 111A is located closer to the combustion chamber 36 than the second jacket 111B is. Therefore, the portion of the cylinder head 30 which is close to the combustion chamber 36 can be cooled with priority.

Figure 33:
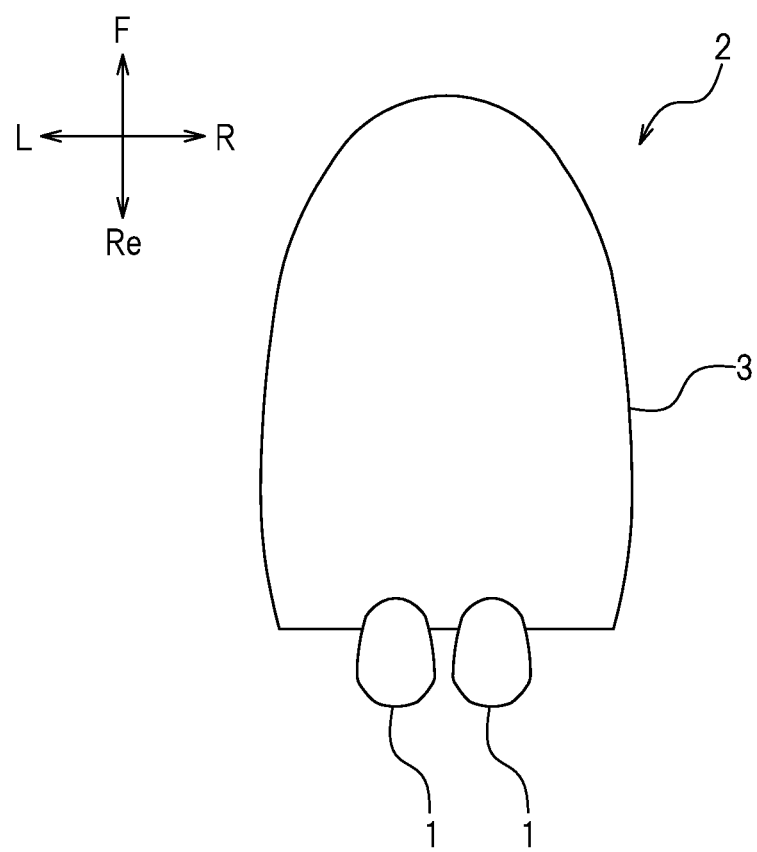
FIG. 33 is a schematic plan view of a watercraft including a plurality of outboard motors.

One outboard motor 1 may be attached to the hull 3. Alternatively, as shown in FIG. 33, a plurality of outboard motors 1 may be arranged side by side in the width direction. The outboard motors 1 preferably have a smaller width. In the case where a plurality of such outboard motors 1 are arranged side by side in the width direction, the effect of having a smaller width is conspicuously achieved. In the example in FIG. 33, two outboard motors 1 preferably are arranged side by side, for example. However, three or more outboard motors 1 may be arranged side by side, for example.

In the above preferred embodiments, the engine 8 preferably includes the fuel injection devices 60L and 60R that directly inject fuel into the combustion chambers 36 as fuel injection devices to inject fuel. Alternatively, the engine of the outboard motor according to various preferred embodiments of the present invention may include a fuel injection device that injects fuel into the intake ports instead of, or in addition to, the fuel injection devices 60L and 60R to directly inject fuel into the combustion chambers 36.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An outboard motor comprising:
   an engine;
   a water intake opening arranged to suck in water; and
   a water supply path arranged to supply the water sucked in through the water intake opening to the engine; wherein
   the engine includes:
      a cylinder block including a plurality of cylinders each including a piston slidably accommodated therein, the cylinder block including a water jacket arranged to cause water to flow therein;
      a cylinder head attached to the cylinder block so as to cover the cylinders and defining a combustion chamber together with each of the cylinders and the corresponding piston, the cylinder head including an exhaust port facing the combustion chamber to discharge exhaust gas from the combustion chamber and also including a water jacket arranged to cause water to flow therein;
      an exhaust pipe provided to the cylinder head so as to communicate with the exhaust port and including a water jacket arranged to cause water to flow therein;
      a water path arranged to cause the water supplied from the water supply path to flow in the water jacket of the cylinder head, the water jacket of the exhaust pipe, and the water jacket of the cylinder block in this order; and
      a bypass path including one end connected to the water jacket of the cylinder head and another end connected to the water jacket of the cylinder block such that cooling water flows from the water jacket of the cylinder head to the water jacket of the cylinder block.

2. The outboard motor according to claim 1, wherein the exhaust pipe includes a catalyst accommodated therein.

3. The outboard motor according to claim 1, wherein a minimum flow path cross-sectional area of the bypass path is smaller than a minimum flow path cross-sectional area of the water path.

4. The outboard motor according to claim 1, wherein:
   the water jacket of the cylinder block includes a groove extending in an axial direction of the cylinders and arranged around each of the cylinders;

the engine includes a gasket provided between the cylinder head and the cylinder block;

the gasket includes a hole arranged to communicate the water jacket of the cylinder head and the water jacket of the cylinder block with each other;

the hole is located on a vertical bisector of a line connecting centers of two adjacent cylinders among the plurality of cylinders as seen in the axial direction of the cylinders; and the bypass path includes the hole.

5. The outboard motor according to claim 4, wherein:

the water jacket of the cylinder block includes a cut-out groove which is recessed toward a line connecting the centers of two adjacent cylinders among the plurality of cylinders as seen in the axial direction of the cylinders;

the cut-out groove is shallower than the groove extending in the axial direction of the cylinders; and the hole of the gasket is located above the cut-out groove.

6. The outboard motor according to claim 1, wherein:

the water jacket of the cylinder head includes combustion chamber water jackets arranged around the combustion chambers, and an exhaust port water jacket arranged around the exhaust ports in communication with the combustion chamber water jackets; and the water jacket of the cylinder head is arranged to introduce water into the combustion chamber water jackets and discharge water from the exhaust port water jacket to the water jacket of the exhaust pipe.

7. The outboard motor according to claim 6, wherein:

the plurality of cylinders are arranged in a vertical direction;

the combustion chamber water jackets and the exhaust port water jacket are in communication with each other around each of the cylinders;

the combustion chamber water jackets and the exhaust port water jacket are arranged to cause water to flow upward; and the water jacket of the exhaust pipe is arranged to cause water to flow downward.

8. The outboard motor according to claim 6, wherein:

the plurality of cylinders are arranged in a vertical direction;

the combustion chamber water jackets and the exhaust port water jacket are in communication with each other around an uppermost cylinder and a lowermost cylinder among the plurality of cylinders;

the combustion chamber water jackets and the exhaust port water jacket are arranged to cause water to flow upward; and the water jacket of the exhaust pipe is arranged to cause water to flow downward.

9. The outboard motor according to claim 6, wherein:

the plurality of cylinders are arranged in a vertical direction;

the combustion chamber water jackets include a first jacket and a second jacket;

the first jacket is located closer to the combustion chamber than the second jacket is, in a horizontal cross-section including an axis line of each of the plurality of cylinders; and the combustion chamber water jackets are arranged to introduce water from the water supply path into the first jacket.

10. The outboard motor according to claim 6, wherein:

the plurality of cylinders are arranged in a vertical direction;

the combustion chamber water jackets include a first jacket and a second jacket;

the first jacket is located closer to the combustion chamber than the second jacket is, in a horizontal cross-section including an axis line of each of the plurality of cylinders;

the first jacket and the second jacket are in communication with each other in a portion around an uppermost cylinder among the plurality of cylinders;

the second jacket and the exhaust port water jacket are in communication with each other in a portion around each of the plurality of cylinders;

the first jacket is arranged to cause the water introduced from the water supply path to flow upward;

the second jacket is arranged to cause the water to flow downward;

the exhaust port water jacket is arranged to cause the water to flow upward; and the water jacket of the exhaust pipe is arranged to cause the water to flow downward.

11. The outboard motor according to claim 9, wherein:

the cylinder head includes a bolt attached thereto and extending from one of the first jacket and the second jacket to the other of the first jacket and the second jacket;

a portion of the bolt which is located in the first jacket includes a first anticorrosive electrode attached thereto; and a portion of the bolt which is located in the second jacket includes a second anticorrosive electrode attached thereto.

12. The outboard motor according to claim 1, further comprising an outboard motor main body including the engine, the water intake opening and the water supply path, and arranged to tilt about a horizontal axis with respect to a hull;

the water jacket of the exhaust pipe includes an inlet arranged to cause water to flow into the water jacket and an outlet arranged to cause water to flow out of the water jacket; and a water extraction hole is arranged in a portion of the water jacket of the exhaust pipe which is between the inlet and the outlet and is located below the inlet and the outlet when the outboard motor main body is tilted about the horizontal axis.

13. A watercraft comprising:

an outboard motor according to claim 1.

14. The outboard motor according to claim 1, wherein the bypass path directly connects the water jacket of the cylinder head to the water jacket of the cylinder block.

* * * * *